US010099551B2

(12) United States Patent
Iwasaki

(10) Patent No.: US 10,099,551 B2
(45) Date of Patent: Oct. 16, 2018

(54) POWER TRAIN SUPPORTING STRUCTURE FOR VEHICLE

(71) Applicant: MAZDA MOTOR CORPORATION, Hiroshima (JP)

(72) Inventor: Yousuke Iwasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/532,009

(22) PCT Filed: Dec. 18, 2015

(86) PCT No.: PCT/JP2015/085489
§ 371 (c)(1),
(2) Date: May 31, 2017

(87) PCT Pub. No.: WO2016/104362
PCT Pub. Date: Jun. 30, 2016

(65) Prior Publication Data
US 2017/0274764 A1    Sep. 28, 2017

(30) Foreign Application Priority Data

Dec. 22, 2014  (JP) .................................. 2014-258502
Jan. 28, 2015  (JP) .................................. 2015-014527

(51) Int. Cl.
*B60K 17/24* (2006.01)
*B60K 17/354* (2006.01)
(Continued)

(52) U.S. Cl.
CPC ................ *B60K 17/24* (2013.01); *B60K 5/04* (2013.01); *B60K 5/1216* (2013.01); *B60K 17/354* (2013.01); *B60K 2005/006* (2013.01)

(58) Field of Classification Search
CPC ............ B60K 5/1225; B60K 2005/006; B60K 17/24; B60K 17/354; B60K 5/04; B60K 5/1216; B60K 5/12; B60K 5/1208
See application file for complete search history.

(56) References Cited

U.S. PATENT DOCUMENTS 5,595,256 A * 1/1997 Mueller ................. B21D 53/88
                                                        180/232
6,113,144 A * 9/2000 Lapic ....................... B60G 7/02
                                                        280/124.155
(Continued)

FOREIGN PATENT DOCUMENTS

| JP | 2001-354161 A | 12/2001 |
| JP | 2003-104078 A | 4/2003 |
| JP | 2012-051431 A | 3/2012 |

OTHER PUBLICATIONS

International Search Report issued in PCT/JP2015/085489; dated Mar. 1, 2016.

*Primary Examiner* — Jacob B Meyer
(74) *Attorney, Agent, or Firm* — Studebaker & Brackett PC

(57) ABSTRACT

A power train supporting structure for a vehicle is provided with: a power train including a transversely disposed engine, a transmission, and a transfer; and a rear mount bracket which connects a rear portion of the power train and a suspension cross member. A front portion of the rear mount bracket is connected to the transfer at a position which is below a drive shaft, and is in a vehicle up-down directional area that is an overlapping of the transmission and the transfer in view of the vehicle width direction.

20 Claims, 12 Drawing Sheets

(51) Int. Cl.
*B60K 5/04* (2006.01)
*B60K 5/12* (2006.01)
*B60K 5/00* (2006.01)

(56) References Cited

U.S. PATENT DOCUMENTS

| | | | | |
|---|---|---|---|---|
| 6,758,301 | B2* | 7/2004 | Shiba | B60K 5/1208 180/291 |
| 6,955,343 | B2* | 10/2005 | Compain | B60K 5/1225 180/291 |
| 7,108,098 | B2* | 9/2006 | Reese | B62D 21/11 180/291 |
| 8,042,793 | B2* | 10/2011 | Igami | F16F 1/3835 180/297 |
| 8,132,640 | B2* | 3/2012 | Heitkamp | B60K 17/24 180/232 |
| 8,727,380 | B2* | 5/2014 | Akaki | B62D 21/02 280/124.109 |
| 8,985,260 | B2* | 3/2015 | Holoweiko | B60K 13/04 180/296 |
| 9,682,613 | B2* | 6/2017 | Miya | B60K 5/1216 |
| 9,751,565 | B2* | 9/2017 | Tatsuwaki | B62D 21/155 |
| 9,783,234 | B2* | 10/2017 | Tanaka | B62D 21/11 |
| 9,862,269 | B2* | 1/2018 | Roberts | B60K 17/24 |
| 2001/0052432 | A1 | 12/2001 | Yoshioka | |
| 2002/0043057 | A1* | 4/2002 | Shiba | B60K 5/1208 56/1 |
| 2004/0113040 | A1* | 6/2004 | Compain | B60K 5/1225 248/564 |
| 2011/0198889 | A1* | 8/2011 | Takeshita | B62D 21/11 296/203.02 |
| 2012/0306234 | A1* | 12/2012 | Akaki | B62D 21/02 296/187.03 |
| 2014/0216843 | A1* | 8/2014 | Holoweiko | B60K 13/04 180/309 |
| 2014/0367547 | A1* | 12/2014 | Ohnishi | F16F 1/36 248/638 |
| 2015/0021115 | A1* | 1/2015 | Komiya | B62D 21/11 180/312 |
| 2015/0083514 | A1* | 3/2015 | Asano | B62D 21/11 180/312 |
| 2015/0167744 | A1* | 6/2015 | Yoo | F16C 35/047 384/456 |
| 2016/0243935 | A1* | 8/2016 | Yun | B60K 17/24 |
| 2016/0263982 | A1* | 9/2016 | Miya | B60K 5/1216 |
| 2016/0368359 | A1* | 12/2016 | Rawte | B60K 1/00 |
| 2017/0144538 | A1* | 5/2017 | Roberts | B60K 17/24 |
| 2017/0274764 | A1* | 9/2017 | Iwasaki | B60K 17/24 |
| 2017/0368930 | A1* | 12/2017 | Sangha | B60K 17/24 |

* cited by examiner

POWER TRAIN SUPPORTING STRUCTURE FOR VEHICLE

TECHNICAL FIELD

The present invention relates to a power train supporting structure for a vehicle, which supports a power train provided with a transfer for transmitting an output of a transversely disposed engine to rear wheels by a mount bracket, for instance.

BACKGROUND ART

Conventionally, as a vehicle provided with a transversely disposed engine whose rotational axis is aligned with a vehicle width direction, there are known a front-wheel drive vehicle in which only front wheels are driven, and a four-wheel drive vehicle in which four wheels are driven.

In the case of a front-wheel drive vehicle, a power train constituted by a transversely disposed engine and a transmission is, for instance, supported on a vehicle body via a right mount bracket and a left mount bracket mounted on both ends of the power train in the vehicle width direction, and a rear mount bracket mounted on the transmission.

On the other hand, in the case of a four-wheel drive vehicle, a power train (in the specification, equivalent to a power plant) includes a transversely disposed engine, a transmission, and a transfer. The power train is, for instance, supported on a vehicle body via a right mount bracket and a left mount bracket mounted on both ends of the power train in the vehicle width direction, and a rear mount bracket mounted on the transfer.

As described above, whereas a rear mount bracket is connected to a transmission in a front-wheel drive vehicle, a rear mount bracket may be connected to a transfer in a four-wheel drive vehicle.

For instance, a power train structure for a vehicle described in Patent Literature 1 is such that in a four-wheel drive vehicle provided with a transversely disposed engine, a front portion (an engine rear mount bracket 66) of a rear mount bracket is fixedly connected to a lateral portion of a transfer, and a rear portion (a member-side mounting member 60) of the rear mount bracket is fixedly connected to an engine rear mount member.

The engine rear mount member has a shape such that the member bulges upwardly of a vehicle between a driver's seat and a passenger's seat, and transverses in the vehicle width direction at a position below a tunnel portion extending in the front-rear direction. Further, a rear portion (the member-side mounting member 60) of the rear mount bracket is disposed laterally of a propeller shaft, which passes through a space surrounded by the tunnel portion and the engine rear mount member.

In recent years, there is a need for preventing a floor panel including a tunnel portion from bulging into a vehicle compartment in the aspect of securing a space of the vehicle compartment for passengers, and optimizing a pedal layout.

However, in Patent Literature 1, a space for a driver's seat and a passenger's seat may be narrowed because the length of the tunnel portion in the vehicle width direction increases by disposing the mount bracket laterally of the propeller shaft.

Thus, in the power train structure for a vehicle in Patent Literature 1, there is an inconvenience that an appropriate driving position cannot be set due to limitation on an installation space for an accelerator pedal or a brake pedal.

CITATION LIST

Patent Literature

Patent Literature 1: Japanese Unexamined Patent Publication No. 2003-104078

SUMMARY OF INVENTION

Technical Problem

In view of the aforementioned inconveniences, an object of the present invention is to provide a power train supporting structure for a vehicle mounted with a transversely disposed engine, which enables to suppress an influence to a vehicle compartment even when a transfer is provided.

Solution to Problem

The present invention is directed to a power train supporting structure for a vehicle. The power train supporting structure is provided with: a power train including a transversely disposed engine whose rotational axis is aligned with a vehicle width direction, a transmission which transmits an output of the transversely disposed engine to front wheels via a drive shaft, and a transfer which transmits an output of the transmission to rear wheels via a propeller shaft; and a rear mount bracket which connects between a rear portion of the power train and a vehicle body, and which swingably and resiliently supports the power train. A front portion of the rear mount bracket is connected to the transfer at a position which is below the drive shaft and is in a vehicle up-down directional area that is an overlapping of the transmission and the transfer in view of the vehicle width direction.

The expression "an overlapping of the transmission and the transfer in view of the vehicle width direction" means a circumstance that the transmission and the transfer overlap each other in view of from a side of the vehicle, and includes a state that the transmission and the transfer come into non-contact with each other in the vehicle width direction.

The rear mount bracket may be a rear mount bracket integrally formed with an elastic member having an elasticity, or a rear mount bracket constituted by a transfer-side bracket, a vehicle-body-side bracket, and an elastic member having an elasticity.

According to the present invention, in a vehicle mounted with a transversely disposed engine, it is possible to suppress an influence to a vehicle compartment by effectively using a dead space below a drive shaft even when a transfer is provided.

Specifically, in the power train supporting structure for a vehicle, it is possible to arrange the disposing position of the rear mount bracket to the vehicle body on the front side of the vehicle by connecting the rear mount bracket to the transfer at a position below the drive shaft.

Further, in the power train supporting structure for a vehicle, it is easy to arrange the disposing position of the rear mount bracket to the vehicle body on the lower side of the vehicle by connecting the front portion of the rear mount bracket to the transfer in the vehicle up-down directional area that is an overlapping of the transmission and the transfer in view of the vehicle width direction.

For instance, when a rear portion of a rear mount bracket extending in the vehicle front-rear direction is connected to a suspension cross member disposed below a rear end of a transfer, it is possible to dispose the power train supporting structure for a vehicle, specifically, the rear mount bracket at a position substantially equivalent to the position of the suspension cross member in the vehicle up-down direction, and at a position on the front side of the vehicle than the suspension cross member.

According to the aforementioned configuration, in the power train supporting structure for a vehicle, it is possible to arrange the disposing position of the power train to the vehicle body on a lower side of the vehicle. Therefore, for a vehicle type having a front-wheel drive vehicle and a four-wheel drive vehicle, for example, the power train supporting structure for a vehicle makes it possible to easily arrange a connection position between a rear mount bracket and a transmission for the front-wheel drive vehicle, and a connection position between a rear mount bracket and a transfer in the four-wheel drive vehicle to a substantially same position.

In other words, for a vehicle type having a front-wheel drive vehicle and a four-wheel drive vehicle, the power train supporting structure for a vehicle makes it possible to set the total height of the front-wheel drive vehicle and the total height of the four-wheel drive vehicle substantially equal to each other.

Further, in the power train supporting structure for a vehicle, it is possible to prevent a floor panel and a dashboard panel from bulging into a vehicle compartment, and to suppress an increase in the size of a floor tunnel for passing a propeller shaft by arranging the disposing position of the power train to the vehicle body on the lower side of the vehicle.

Therefore, the power train support structure for a vehicle is advantageous in lowering the disposing position of the power train to the vehicle body to the lower side of the vehicle, and in suppressing an influence to a vehicle compartment even when the transfer is provided.

Advantageous Effects of Invention

As described above, according to the present invention, in a vehicle mounted with a transversely disposed engine, it is possible to provide a power train supporting structure for a vehicle, which enables to suppress an influence to a vehicle compartment even when a transfer is provided.

DESCRIPTION OF EMBODIMENTS

First Embodiment

In the following, the first embodiment of the present invention is described along with the drawings.

First of all, a power train supporting structure for a vehicle 1 in the first embodiment is described in detail using FIG. 1 to FIG. 5.

Figure 1:
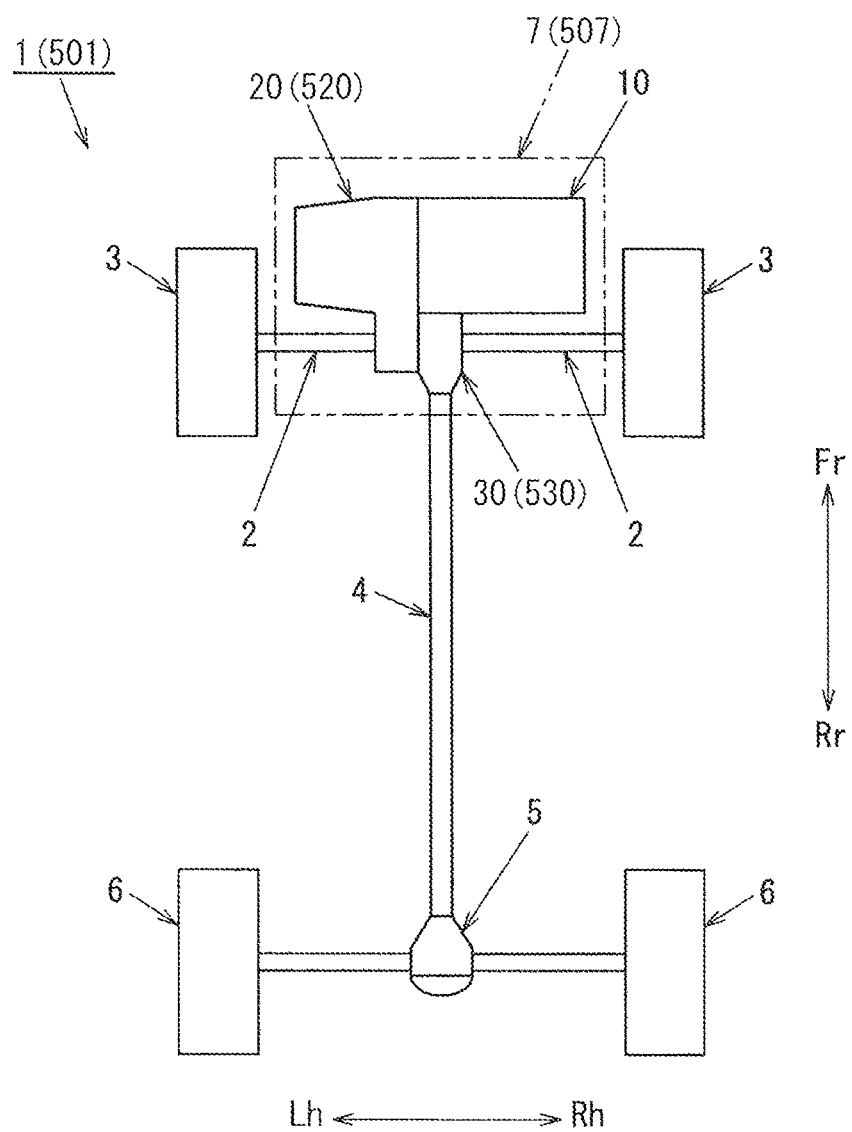
FIG. 1 is an explanatory diagram illustrating a configuration of a vehicle.
Figure 2:
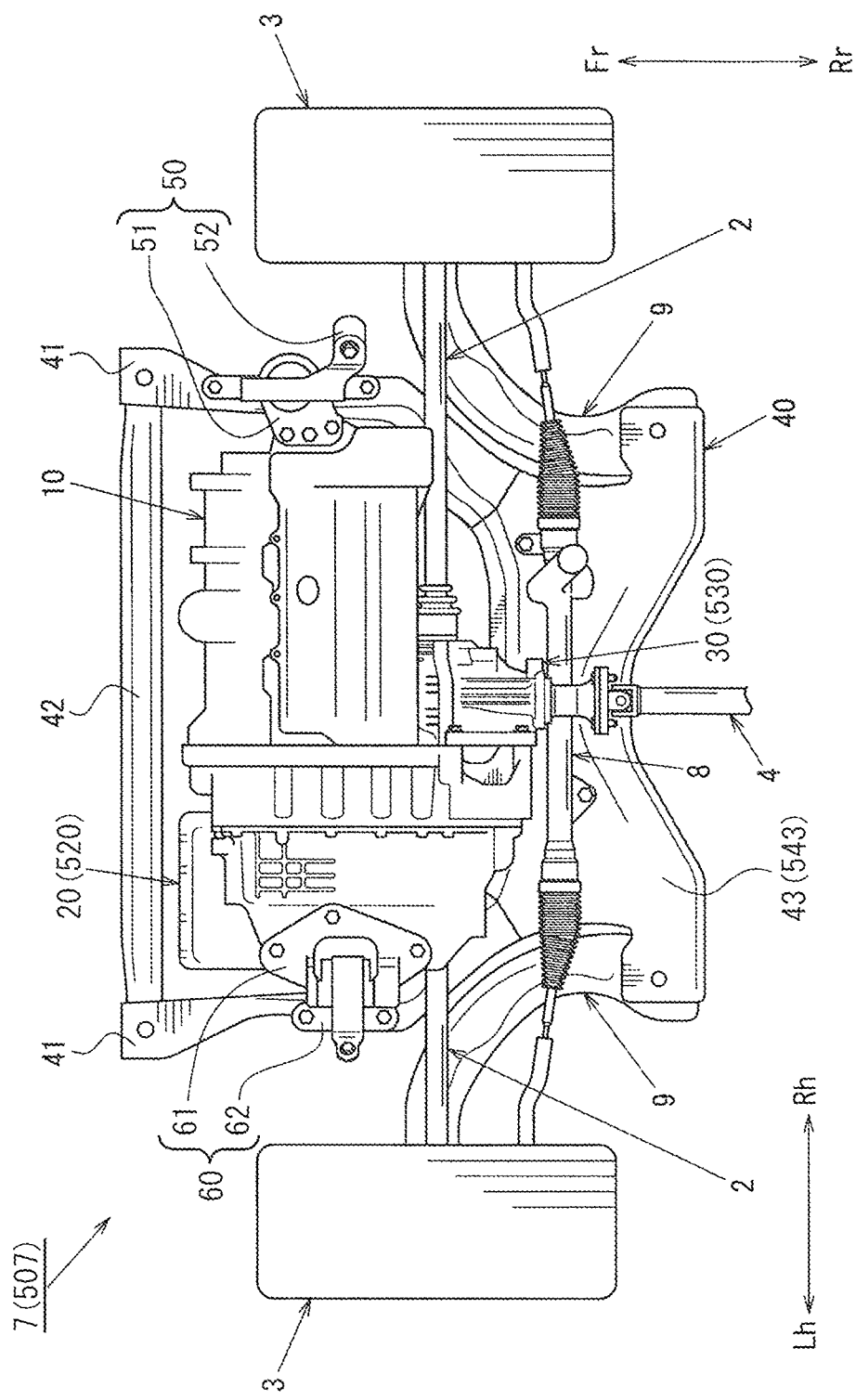
FIG. 2 is a plan view illustrating an external appearance of a power train for a vehicle.
Figure 3:
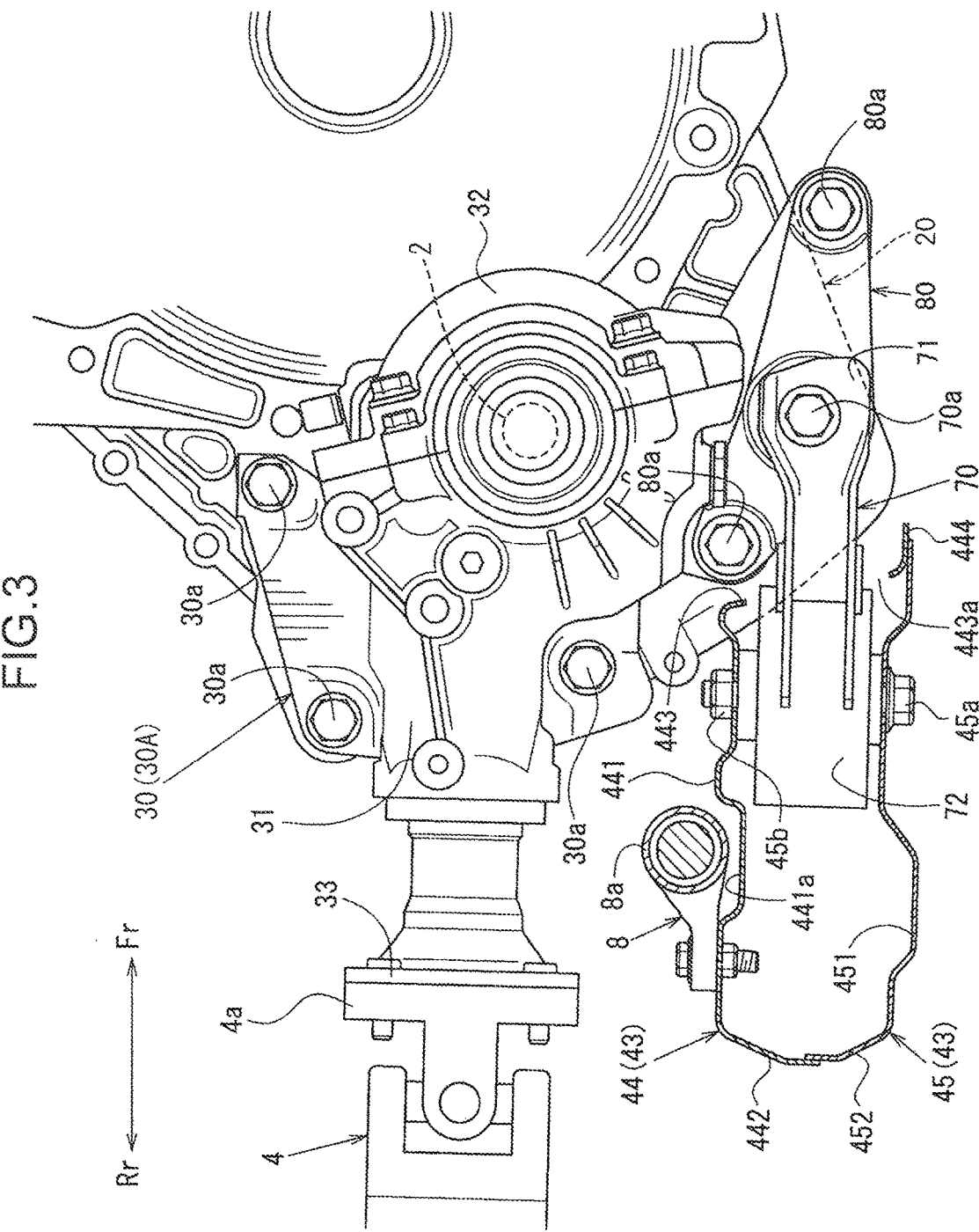
FIG. 3 is an essential part right side view illustrating essential parts of a power train supporting structure when viewed from the right side.
Figure 4:
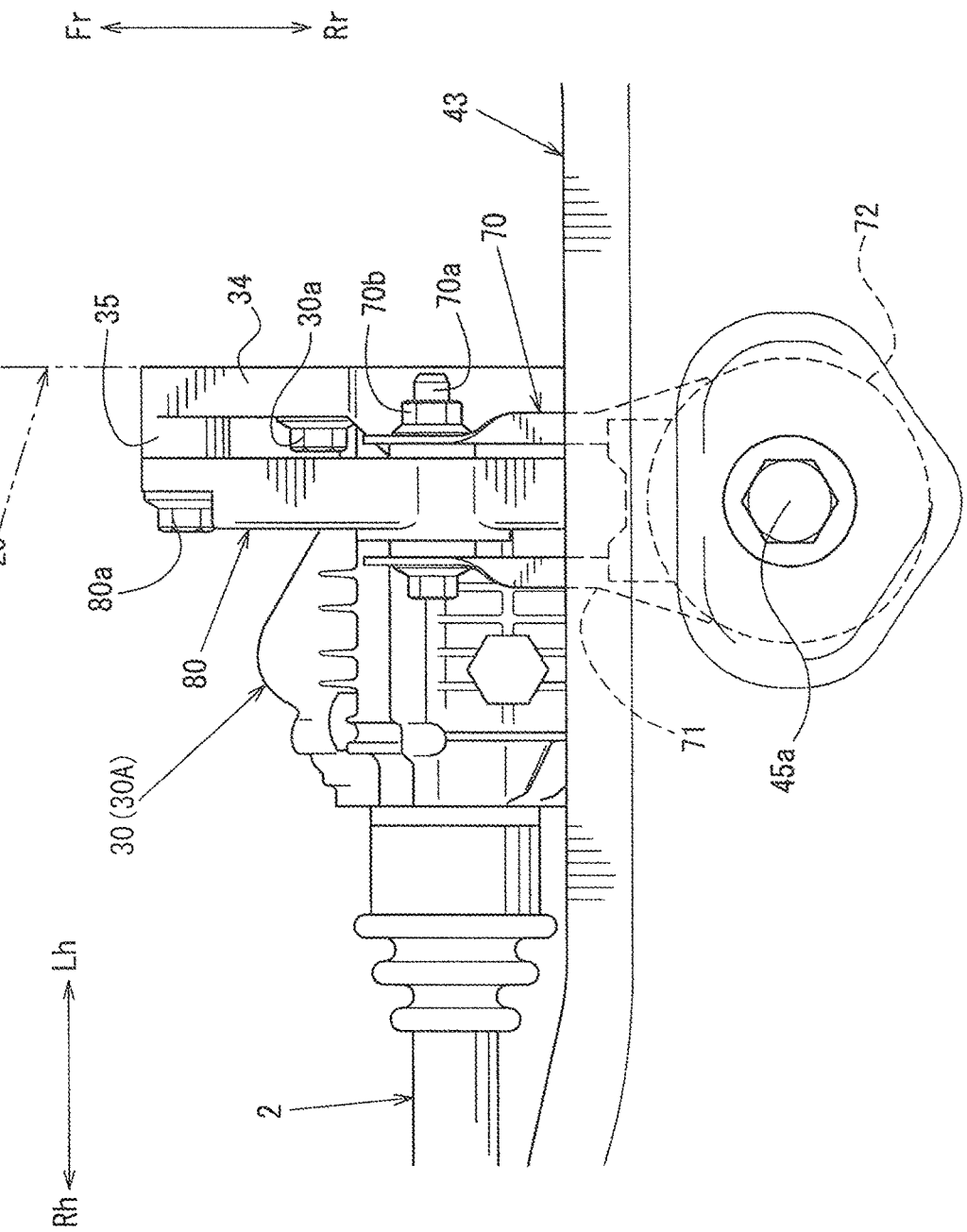
FIG. 4 is an essential part bottom view illustrating essential parts of the power train supporting structure when viewed from the bottom.
Figure 5:
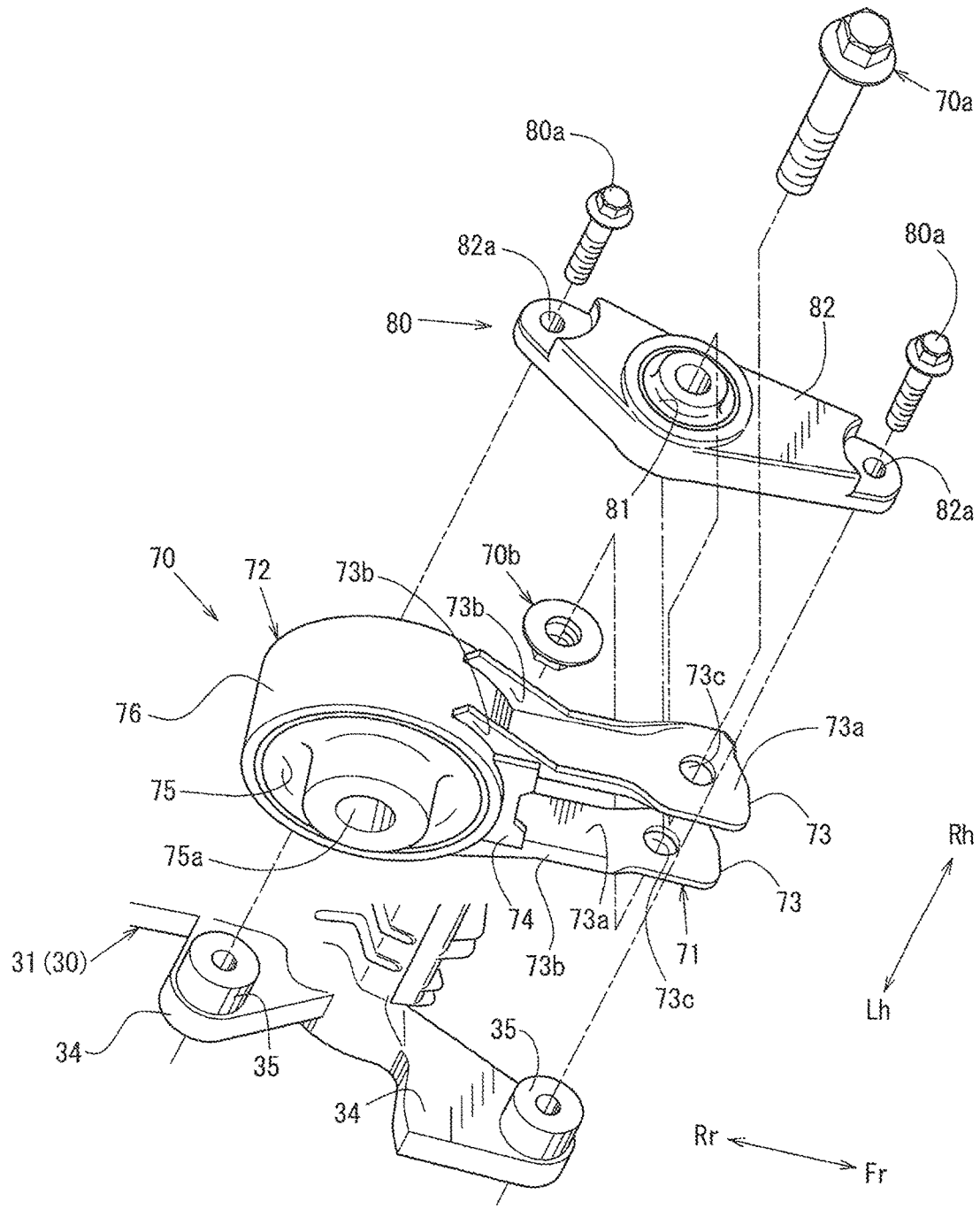
FIG. 5 is an exploded perspective view illustrating a disassembled state of essential parts in the power train supporting structure when viewed from the lower side of the vehicle.

FIG. 1 is an explanatory diagram illustrating a configuration of the vehicle 1. FIG. 2 is a plan view illustrating an external appearance of a power train 7 in the vehicle 1. FIG. 3 is an essential part right side view of a power train supporting structure when viewed from the right side. FIG. 4 is an essential part bottom view illustrating the power train supporting structure when viewed from the bottom. FIG. 5 is an exploded perspective view illustrating essential parts in the power train support structure when viewed from the lower side of the vehicle.

Further, in the drawings, arrows Fr and Rr indicate vehicle front-rear directions, wherein the arrow Fr indicates a vehicle front side, and the arrow Rr indicates a vehicle rear side. Further, arrows Rh and Lh indicate vehicle width directions, wherein the arrow Rh indicates a vehicle right side, and the arrow Lh indicates a vehicle left side. In addition to the above, the upper direction in FIG. 3 indicates a vehicle upper side, and the lower direction in FIG. 3 indicates a vehicle lower side.

The vehicle 1 is a so-called FF-based four-wheel drive vehicle, in which the power train 7 is disposed in a vehicle front portion. As illustrated in FIG. 1, the power train 7 (equivalent to a power plant) is configured to transmit an output of a transversely disposed engine 10 whose crankshaft is aligned with the vehicle width direction to front wheels 3 via drive shafts 2, and to transmit an output of the transversely disposed engine 10 to rear wheels 6 via a propeller shaft 4 and a rear differential gear 5.

More specifically, as illustrated in FIG. 2, a front portion of the vehicle 1 includes a pair of left and right front-side frames (not illustrated) extending from a dashboard panel (not illustrated) forwardly of the vehicle, a sub frame 40 disposed below the front-side frames, and the power train 7 disposed between the paired left and right front-side frames and the sub frame 40, and at a position such that the transversely disposed engine 10 is located on the vehicle front side than a steering gear box 8, which is fixed to a rear portion of the sub frame 40. The power train 7 is supported on the frames 40 via a support member to be described later.

Note that the steering gear box 8 functions as a steering device which connects between a steering wheel (not illustrated) to be operated by a driver, and the front wheels 3, and which converts an input rotation by an operation of the steering wheel via a gear accommodated in a substantially cylindrical main body cylindrical portion 8a (see FIG. 4) extending in the vehicle width direction for changing the direction of the front wheels 3.

The sub frame 40 includes a pair of left and right front-rear members 41 extending in the vehicle front-rear direction, a front cross member 42 which connects front ends of the front-rear members 41 in the vehicle width direction, and a suspension cross member 43 which connects rear ends of the front-rear members 41 in the vehicle width direction, and which is connected to a suspension member such as a lower arm 9. The sub frame 40 is integrally formed into a substantially rectangular shape in plan view by the members 41 to 43.

As illustrated in FIG. 3, the suspension cross member 43 is integrally formed by joining an upper panel 44 located on the vehicle upper side, and a lower panel 45 located on the vehicle lower side one over the other in the vehicle up-down direction.

More specifically, as illustrated in FIG. 3, the upper panel 44 is integrally formed by a top plate portion 441 which forms an upper surface of the suspension cross member 43, an inner rear wall portion 442 extending from a rear end of the top plate portion 441 rearwardly and downwardly of the vehicle, an inner front wall portion 443 extending from a front end of the top plate portion 441 forwardly and downwardly of the vehicle, and a front edge portion 444 extending from a front end of the inner front wall portion 443 forwardly of the vehicle.

A bolt opening hole (not illustrated), and a groove portion 441a are formed in this order from the vehicle front side substantially at a middle of the top plate portion 441 in the vehicle width direction. A connection bolt 45a for connecting a rear mount bracket 70 to be described later passes through the bolt opening hole. The steering gear box 8 is disposed in the groove portion 441a. The groove portion 441a extends in the vehicle width direction.

The groove portion 441a is formed into a substantially groove shape along the main body cylindrical portion 8a of the steering gear box 8 in a state that a part of the top plate portion 441 projects downwardly of the vehicle. The groove portion 441a has a size capable of receiving the main body cylindrical portion 8a of the steering gear box 8.

The inner front wall portion 443 is formed with a bracket insertion hole 443a, which is opened with a size capable of receiving the rear mount bracket 70 to be described later from the vehicle front side into the suspension cross member 43.

As illustrated in FIG. 3, the lower panel 45 faces the top plate portion 441 of the upper panel 44 on the vehicle lower side; and is integrally formed by a bottom plate portion 451 in contact with the front edge portion 444, and an outer rear wall portion 452 extending from a rear end of the bottom plate portion 451 upwardly of the vehicle.

A bolt opening hole (not illustrated) for receiving the connection bolt 45a is formed in the bottom plate portion 451 at a position facing the bolt opening hole of the upper panel 44 on the vehicle lower side.

As illustrated in FIG. 1 to FIG. 3, the power train 7 (equivalent to a power plant) includes the transversely disposed engine 10 whose crankshaft is aligned with the vehicle width direction, a transmission 20 which outputs an output of the transversely disposed engine 10 to the drive shafts 2, and a transfer 30 which outputs an output of the transmission 20 to the propeller shaft 4.

The transversely disposed engine 10 is disposed on the right side in the vehicle width direction in a state that an output shaft (a crankshaft) thereof is located on the vehicle left side.

The transmission 20 is disposed on the vehicle left side of the transversely disposed engine 10, and is fixedly connected with the transversely disposed engine 10 in a state that an input shaft of the transmission 20 is substantially coaxial with the output shaft of the transversely disposed engine 10. The transmission 20 outputs an input rotation to the output shaft, which is disposed in parallel to the input shaft at a position below the input shaft on the vehicle rear side, while reducing the input rotation by switching between a plurality of gears.

Further, the paired left and right drive shafts 2 to be connected to an output shaft of the transmission 20 are disposed substantially coaxial with the output shaft of the transmission 20. Note that the drive shaft 2 to be connected to the front wheel 3 on the vehicle right side is connected to the output shaft of the transmission 20 via the transfer 30 to be described later.

The transfer 30 is disposed at such a position that an input shaft thereof is located substantially coaxial with the output shaft of the transmission 20 on the vehicle right side, and is fixedly fastened with a portion of the transmission 20 on the vehicle right side with use of a fastening bolt 30a. The transfer 30 includes a transfer body 30A, and an intermediate bracket 80 mounted on a lower portion of the transfer body 30A. The transfer body 30A includes a transfer case 31, a cover 32, a ring gear (not illustrated), a drive pinion (not illustrated), and support leg portions 34.

Specifically, as illustrated in FIG. 3, the transfer 30 (specifically, the transfer body 30A) accommodates and holds the ring gear to which an input from the transmission 20 is transmitted, and the drive pinion engageable with the ring gear and serving as an output shaft in an inner space defined by the transfer case 31 located on the vehicle rear side, and the cover 32 located on the vehicle front side with respect to the transfer case 31.

Note that a companion flange 33 is mounted on a rear end of the drive pinion. The companion flange 33 is connected to a flange yoke 4a of the propeller shaft 4.

Further, as illustrated in FIG. 4 and FIG. 5, the transfer body 30A includes the paired support leg portions 34 extending from the transfer case 31 forwardly and downwardly of the vehicle, and rearwardly and downwardly of the vehicle at a lower portion of the transfer case 31. The support leg portions 34 support the intermediate bracket 80 to be described later on the lower side of the transfer case 31.

Each of the support leg portions 34 has a boss portion 35 on which the intermediate bracket 80 is mounted. Specifically, the boss portion 35 comes into contact with the intermediate bracket 80 disposed substantially at a middle of the vehicle 1 in the vehicle width direction. The boss portion 35 is formed to project toward the vehicle right side on distal ends of the paired support leg portions 34. A screw hole (not illustrated) engageable with a fastening bolt 80a for fastening the intermediate bracket 80 is formed in each of the boss portions 35.

As illustrated in FIG. 2 and FIG. 3, the power train 7 having the aforementioned configuration is swingably supported on the vehicle body i.e. each frame between the front-side frames and the sub frame 40 via a right mount bracket 50, a left mount bracket 60, which are disposed along the vehicle width direction from the vehicle right side, and the rear mount bracket 70 disposed on the vehicle rear side than the right mount bracket 50 and the left mount bracket 60.

As illustrated in FIG. 2, the right mount bracket 50 swingably connects between an upper right portion of the transversely disposed engine 10 in the vehicle width direction, and the front-side frame on the vehicle right side. The right mount bracket 50 is made by connecting an engine-side bracket 51 fixed to the transversely disposed engine 10, and a vehicle-body-side bracket 52 fixed to the front-side frame via a mount bush (not illustrated) made of rubber and having an elasticity.

As illustrated in FIG. 2, the left mount bracket 60 swingably connects between an upper left portion of the transmission 20 in the vehicle width direction, and the front-side frame on the vehicle left side. The left mount bracket 60 is made by connecting a transmission-side bracket 61 fixed to the transmission 20, and a vehicle-body-side bracket 62 fixed to the front-side frame via a mount bush (not illustrated) made of rubber and having an elasticity.

As illustrated in FIG. 3 and FIG. 4, the rear mount bracket 70 swingably connects between the transfer 30 and the suspension cross member 43 substantially at a middle of the vehicle 1 in the vehicle width direction via a lower portion of the transfer body 30A, specifically, via the intermediate bracket 80 fastened with right surfaces of the support leg portions 34.

More specifically, the rear mount bracket 70 linearly extends in the vehicle front-rear direction; and includes a bracket front portion 71 connected to the intermediate bracket 80, and a bracket rear portion 72 connected to the suspension cross member 43. Specifically, as illustrated in FIG. 3 to FIG. 5, the rear mount bracket 70 is integrally formed by joining the bracket front portion 71 connected to the intermediate bracket 80 with use of a connection bolt 70a to be received along the vehicle width direction, and a nut 70b; and the bracket rear portion 72 connected to the suspension cross member 43 with use of the connection bolt 45a to be received in the vehicle up-down direction, and a nut 45b one over the other in this order from the vehicle front side.

Note that the rear mount bracket 70 is constituted by the bracket front portion 71 and the bracket rear portion 72 in such a manner that the bracket front portion 71 and the bracket rear portion 72 are connected to the intermediate bracket 80 on the vehicle front side than the inner front wall portion 443 of the suspension cross member 43.

The bracket front portion 71 is integrally formed by a pair of left and right opposing plates 73 which face each other with a predetermined gap in the vehicle width direction, and which holds the intermediate bracket 80 (a front mount bush 81 to be described later); and a pair of upper and lower reinforcement plates 74 which connect between an upper portion and a lower portion of the paired opposing plates 73 in the vehicle width direction.

As illustrated in FIG. 5, the opposing plates 73 are formed by bending a substantially rectangular metal flat plate extending in the vehicle front-rear direction. Each of the opposing plates 73 is integrally formed by an opposing plate body portion 73a whose thickness direction is aligned with the vehicle width direction, and an opposing plate wall portion 73b extending from an end of the opposing plate body portion 73a in the vehicle up-down direction outwardly in the vehicle width direction.

Further, a bolt insertion hole 73c for receiving the connection bolt 70a is formed in a front end of the opposing plate body portion 73a of each of the opposing plates 73.

Each of the reinforcement plates 74 has such a size that the reinforcement plate 74 is connected to a rear end of the opposing plate wall portion 73b of the opposing plate 73 in the vehicle width direction.

As illustrated in FIG. 3 and FIG. 5, the bracket rear portion 72 is held between the upper panel 44 and the lower panel 45 in a state that the bracket rear portion 72 is connected to the suspension cross member 43. The bracket rear portion 72 includes a substantially cylindrical rear mount bush 75 whose axis direction is aligned with the vehicle up-down direction, and a metal bush support cylindrical portion 76 for press-fitting the rear mount bush 75.

Although detailed illustration is omitted, the rear mount bush 75 is constituted by a small-diameter tubular member having an inner diameter capable of receiving the connection bolt 45a, a large-diameter tubular member whose diameter is larger than the diameter of the small-diameter tubular member, and synthetic rubber having an elasticity and filled in a gap between the small-diameter tubular member and the large-diameter tubular member, which are coaxially disposed in such a manner that peripheral surfaces thereof face each other. Note that an inner space of the rear mount bush 75 for receiving the connection bolt 45a is referred to as a bolt insertion hole 75a.

The bush support cylindrical portion 76 is formed into a substantially cylindrical shape having an inner diameter and an axial length for allowing press-fit of the rear mount bush 75. A rear end of the bracket front portion 71 is joined to the outer peripheral surface of the bush support cylindrical portion 76 by welding or the like.

As illustrated in FIG. 3 to FIG. 5, the intermediate bracket 80 includes the substantially cylindrical front mount bush 81 whose axis direction is aligned with the vehicle width direction, and a bracket body 82 made of aluminum alloy and having a predetermined thickness.

Although detailed illustration is omitted, the front mount bush 81 is constituted by a small-diameter tubular member having an inner diameter capable of receiving the connection bolt 70a, a large-diameter tubular member whose diameter is larger than the diameter of the small-diameter tubular member, and synthetic rubber having an elasticity and filled in a gap between the small-diameter tubular member and the large-diameter tubular member, which are coaxially disposed in such a manner that peripheral surfaces thereof face each other.

The bracket body 82 has a substantially inverted triangular shape in side view. A bolt insertion hole 82a for receiving a fastening bolt 80a engageable with the boss portion 35 of the transfer 30 is formed in both ends of the bracket body 82 in the vehicle front-rear direction along the vehicle width direction. The bracket body 82 is disposed to transverse the drive shafts 2 in the vehicle front-rear direction.

Further, a bush opening hole (not illustrated) for press-fitting the front mount bush 81 is formed in the bracket body 82.

The bush opening hole is formed in the vicinity of a specified position which is on substantially the same as the position of the drive shaft 2 in the vehicle front-rear direction, and which is in the vehicle up-down directional area that faces a lower end portion of the transmission 20, and is an overlapping of the transmission 20 and the transfer 30 in view of the vehicle width direction.

In other words, as illustrated in FIG. 3, the intermediate bracket 80 has such a configuration as to allow the transfer 30 and the rear mount bracket 70 to be connected with each other at a position which is below the drive shaft 2 in the vehicle front-rear direction, and which is in the vehicle up-down directional area that faces a lower end portion of the transmission 20, and that is an overlapping of the transmission 20 and the transfer 30 in view of the vehicle width direction.

On the other hand, the rear mount bracket 70 and the intermediate bracket 80 have such a configuration with respect to the vehicle body as to allow the transfer 30 and the rear mount bracket 70 to be connected at a position which is on the vehicle front side than the inner wall portion 443 of the suspension cross member 43, and on the lower side of the drive shaft 2.

More specifically, the intermediate bracket 80 has such a configuration as to ensure the connection position of the rear mount bracket 70 to the transfer at a vicinity of a lower end of the power train 7 located above an intersection position where an imaginary line in the vehicle width direction along the output shaft of the transmission 20 in bottom view and an imaginary centerline of the vehicle 1 in the vehicle width direction in bottom view intersect each other.

Further, the rear mount bracket 70 and the intermediate bracket 80 have such a configuration as to allow an intersection position of a TM-side imaginary line extending from the output shaft of the transmission 20 downwardly of the vehicle in side view and a vehicle-body-side imaginary line extending from an imaginary midpoint of the rear mount bush 75 connected to the suspension cross member 43 in the axis direction forwardly of the vehicle to coincide with the connection position of the transfer 30 and the rear mount bracket 70 to the vehicle body.

The power train supporting structure for the vehicle 1 for supporting the power train 7 having the aforementioned configuration is advantageous, in the vehicle 1 mounted with the transversely disposed engine 10, suppressing an influence to a vehicle compartment even when the transfer 30 is provided.

Specifically, in the power train supporting structure for the vehicle 1, it is possible to arrange the disposing position of the rear mount bracket 70 to the vehicle body on the vehicle front side by connecting the rear mount bracket 70 to the transfer 30 at a position below the drive shafts 2.

Further, in the power train supporting structure for the vehicle 1, it is easy to arrange the disposing position of the rear mount bracket 70 to the vehicle body on the vehicle lower side by connecting the bracket front portion 71 to the transfer 30 at a position which is in the vehicle up-down directional area that is an overlapping of the transmission 20 and the transfer 30 in view of the vehicle width direction.

Specifically, in the power train support structure for the vehicle 1, it is possible to dispose the rear mount bracket 70 at a position substantially equivalent to the position of the suspension cross member 43 in the vehicle up-down direction, and at a position on the vehicle front side than the suspension cross member 43 by connecting the bracket rear portion 72 of the rear mount bracket 70 to the suspension cross member 43 disposed below a rear end of the transfer 30.

According to the aforementioned configuration, in the power train supporting structure for the vehicle 1, it is possible to lower the disposing position of the power train 7 to the vehicle body on the vehicle lower side. Therefore, for a vehicle type having a front-wheel drive vehicle and a four-wheel drive vehicle, the power train supporting structure for the vehicle 1 makes it possible to easily set a connection position between a rear mount bracket and the transmission 20 in the front-wheel drive vehicle, and a connection position between the rear mount bracket 70 and the transfer 30 in the four-wheel drive vehicle to the substantially same position.

In other words, for a vehicle type having a front-wheel drive vehicle and a four-wheel drive vehicle, the power train supporting structure for the vehicle 1 makes it possible to set the total height of the front-wheel drive vehicle and the total height of the four-wheel drive vehicle substantially equal to each other.

Further, in the power train supporting structure for the vehicle 1, it is possible to prevent a floor panel and a dashboard panel from bulging into a vehicle compartment by setting the disposing position of the power train 7 to the vehicle body on the vehicle lower side. Further, in the power train supporting structure for the vehicle 1, it is possible to dispose a mounting position of the power train 7 on the vehicle lower side, as compared with a conventional mounting position. This makes it possible to dispose the rear mount bracket 70 on the vehicle lower side than the propeller shaft 4 in the vehicle up-down direction, and to dispose the propeller shaft 4 itself on the lower side, as compared with a conventional configuration. This is advantageous in suppressing an increase in the size of a floor tunnel for passing the propeller shaft 4.

Therefore, in the power train supporting structure for the vehicle 1, it is possible to lower the disposing position of the power train 7 to the vehicle body on the vehicle lower side. This is advantageous in suppressing an influence to a vehicle compartment even when the transfer 30 is provided.

Further, in the power train supporting structure for the vehicle 1, it is possible to suppress interference with an element on the vehicle body side even when the disposing position of the power train 7 to the vehicle body is lowered by configuring the bracket rear portion 72 to include the bolt insertion hole 75*a* for receiving the connection bolt 45*a* in the vehicle up-down direction, and the rear mount bush 75 having an elasticity.

Specifically, for instance, when a rear mount bracket including a rear mount bush for passing a connection bolt in the vehicle width direction is connected to the suspension cross member 43, it is necessary to dispose a member-side bracket for supporting the rear mount bracket on the upper surface of the suspension cross member 43.

Further, in the case of a substantially cylindrical rear mount bush, the length of a rear mount bracket in the vehicle up-down direction tends to increase depending on the outer diameter of the rear mount bush. As a result, the height of a member-side bracket may increase. In this case, when the disposing position of the power train 7 to the vehicle body is lowered, the transfer 30 or the propeller shaft 4 may interfere with the member-side bracket.

On the other hand, in the power train supporting structure for the vehicle 1, it is possible to suppress an increase in the length of the rear mount bracket 70 in the vehicle up-down direction by providing the rear mount bush 75 for passing the connection bolt 45*a* in the vehicle up-down direction on the rear mount bracket 70.

More specifically, in the case of the rear mount bush 75, an axial length of the rear mount bush 75 tends to be short, as compared with a radial length of the rear mount bush 75. Therefore, the rear mount bracket 70 configured such that the connection bolt 45*a* is received in the rear mount bush 75 in the vehicle up-down direction is advantageous in suppressing an increase in the length in the vehicle up-down direction, as compared with a configuration, in which a connection bolt is received in the vehicle width direction.

According to the aforementioned configuration, in the power train supporting structure for the vehicle 1, it is possible to suppress an increase in the thickness of the suspension cross member 43 connected to the bracket rear portion 72 of the rear mount bracket 70, as compared with a configuration, in which the connection bolt 45*a* is received in the vehicle width direction.

Therefore, in the power train supporting structure for the vehicle 1, it is possible to prevent interference of the transfer 30 or the propeller shaft 4 with an element on the vehicle body side, for instance, a floor panel even when the disposing position of the power train 7 to the vehicle body is lowered by providing the rear mount bush 75, which is configured such that the connection bolt 45*a* is received in the vehicle up-down direction.

Further, the power train supporting structure for the vehicle 1 is advantageous in lowering the disposing position of the power train 7 to the vehicle body further on the vehicle lower side by forming the groove portion 441*a* in the suspension cross member 43, and by disposing the steering gear box 8 in the groove portion 441*a* of the suspension cross member 43.

Specifically, in the vehicle 1 mounted with the transversely disposed engine 10, it is often the case that the steering gear box 8 is mounted on the vehicle rear side than the power train 7. Therefore, when the disposing position of the power train 7 to the vehicle body is lowered, for instance, a rear end of the transfer 30 or the propeller shaft 4 may interfere with the steering gear box 8.

In view of the above, in the power train supporting structure for the vehicle 1, it is possible to lower the disposing position of the steering gear box 8 to the vehicle body on the vehicle lower side by disposing the steering gear box 8 in the groove portion 441*a* formed in the suspension cross member 43. In other words, the power train supporting structure for the vehicle 1 is advantageous in lowering the disposing position of the power train 7 to the vehicle body further on the vehicle lower side without interference between the power train 7 and the steering gear box 8.

Further, for a vehicle type having a front-wheel drive vehicle and a four-wheel drive vehicle, the power train supporting structure for the vehicle 1 makes it possible to set the disposing position of the steering gear box 8 to the vehicle body to a substantially same position between the front-wheel drive vehicle and the four-wheel drive vehicle. Therefore, the power train supporting structure for the vehicle 1 is advantageous in suppressing a difference in the disposing position of the power train 7 to the vehicle body between a front-wheel drive vehicle and a four-wheel drive vehicle, and in increasing the ratio of common components.

In addition to the above, in the power train supporting structure for the vehicle 1, the disposing position of the power train 7 and the disposing position of the steering gear box 8 to the vehicle body are set to a substantially same position between the front-wheel drive vehicle and the four-wheel drive vehicle. Therefore, in the power train supporting structure for the vehicle 1, it is possible to make a geometry on suspension-related components common to a front-wheel drive vehicle and a four-wheel drive vehicle, for instance.

As described above, in the power train supporting structure for the vehicle 1, it is possible to lower the disposing position of the power train 7 to the vehicle body further on the vehicle lower side, and it is easy to design the vehicle type having a front-wheel drive vehicle and a four-wheel drive vehicle by disposing the steering gear box 8 in the groove portion 441*a* of the suspension cross member 43.

Further, the power train supporting structure for the vehicle 1, in which the bracket front portion 71 and the transfer 30 are connected with each other via the intermediate bracket 80 formed with the front mount bush 81, makes it possible to easily interpose the front mount bush 81 without providing a modified transfer case 31 (transfer body 30A).

Specifically, even in the vehicle 1 mounted with the transversely disposed engine 10, the size of the front mount bush 81 is likely to differ between vehicle types. In view of the above, if a front mount bush 81 is integrally formed with the transfer 30, it is necessary to provide a modified transfer case 31 for each vehicle type.

On the other hand, in the power train supporting structure for the vehicle 1, it is possible to connect the transfer 30 and the rear mount bracket 70 via the front mount bush 81 appropriately for each type of vehicle without providing a modified transfer case 31 by the intermediate bracket 80 formed with the front mount bush 81.

As described above, in the power train supporting structure for the vehicle 1, the transfer 30 and the rear mount bracket 70 are connected via the intermediate bracket 80. This makes it easy to interpose the front mount bush 81 without providing a modified transfer case 31.

Further, the power train supporting structure for the vehicle 1 is provided with the right mount bracket 50 which swingably and resiliently supports the transversely disposed engine 10, and the left mount bracket 60 which swingably and resiliently supports the transmission 20. The rear mount bracket 70 is disposed substantially at a middle of the vehicle body in the vehicle width direction. The right mount bracket 50 and the left mount bracket 60 are configured to suspend the power train 7 on the vehicle front side than the bracket front portion 71, and on the vehicle upper side. Therefore, in the power train supporting structure for the vehicle 1, it is possible to support the power train 7 as a heavy member in a well-balanced manner, and to suppress an influence to a vehicle compartment.

Specifically, for a vehicle type having a front-wheel drive vehicle and a four-wheel drive vehicle, a gravity center of the power train 7 in the front-wheel drive vehicle and a gravity center of the power train 7 in the four-wheel drive vehicle are likely to differ from each other due to a difference in constituent components.

Therefore, when the rear mount bracket 70 is disposed in alignment with a gravity center, the position of the rear mount bracket 70 in the vehicle width direction is liable to differ between a front-wheel drive vehicle and a four-wheel drive vehicle.

In view of the above, in the power train supporting structure for the vehicle 1, it is possible to support the power train 7 of a front-wheel drive vehicle, and the power train 7 of a four-wheel drive vehicle substantially at the same position by disposing the rear mount bracket 70 substantially at a middle of the vehicle in the vehicle width direction.

In this case, an imaginary line connecting the right mount bracket 50, the left mount bracket 60, and the rear mount bracket 70 forms a substantially triangle in plan view. Therefore, in the power train supporting structure for the vehicle 1, it is possible to support the power train 7 in a well-balance manner.

Thus, in the power train supporting structure for the vehicle 1, it is possible to support the power train 7 as a heavy member in a well-balanced manner, and to suppress an influence to a vehicle compartment by causing the right mount bracket 50, the left mount bracket 60, and the rear mount bracket 70 to swingably support the power train 7.

In the aforementioned embodiment, the rear mount bracket 70 is constituted by the bracket front portion 71, and the bracket rear portion 72 including the rear mount bush 75. The embodiment, however, is not limited to the above. For instance, a torque rod including a mount bush may be provided on the bracket front portion and on the bracket rear portion.

Further, the bracket rear portion 72 of the rear mount bracket 70 is directly connected to the suspension cross member 43. The embodiment, however, is not limited to the above. For instance, a rear mount bracket may be connected to the suspension cross member 43 via a vehicle-body-side bracket.

Further, the front mount bush 81 and the rear mount bush 75 are filled with synthetic rubber. The embodiment, however, is not limited to the above. A liquid-sealed mount bush or the like may be used.

Regarding the correspondence between the configuration of the present invention, and the aforementioned embodiment, a front portion of a rear mount bracket in the present invention corresponds to the bracket front portion 71 in the embodiment.

Likewise, a rear portion of a rear mount bracket corresponds to the bracket rear portion 72;

a cross member corresponds to the suspension cross member 43;

a groove portion corresponds to the groove portion 441a;

an engine-side mount bracket corresponds to the right mount bracket 50; and a transmission-side mount bracket corresponds to the left mount bracket 60.

The present invention, however, is not limited to the configuration of the embodiment, but may include many other embodiments.

Figure 6:
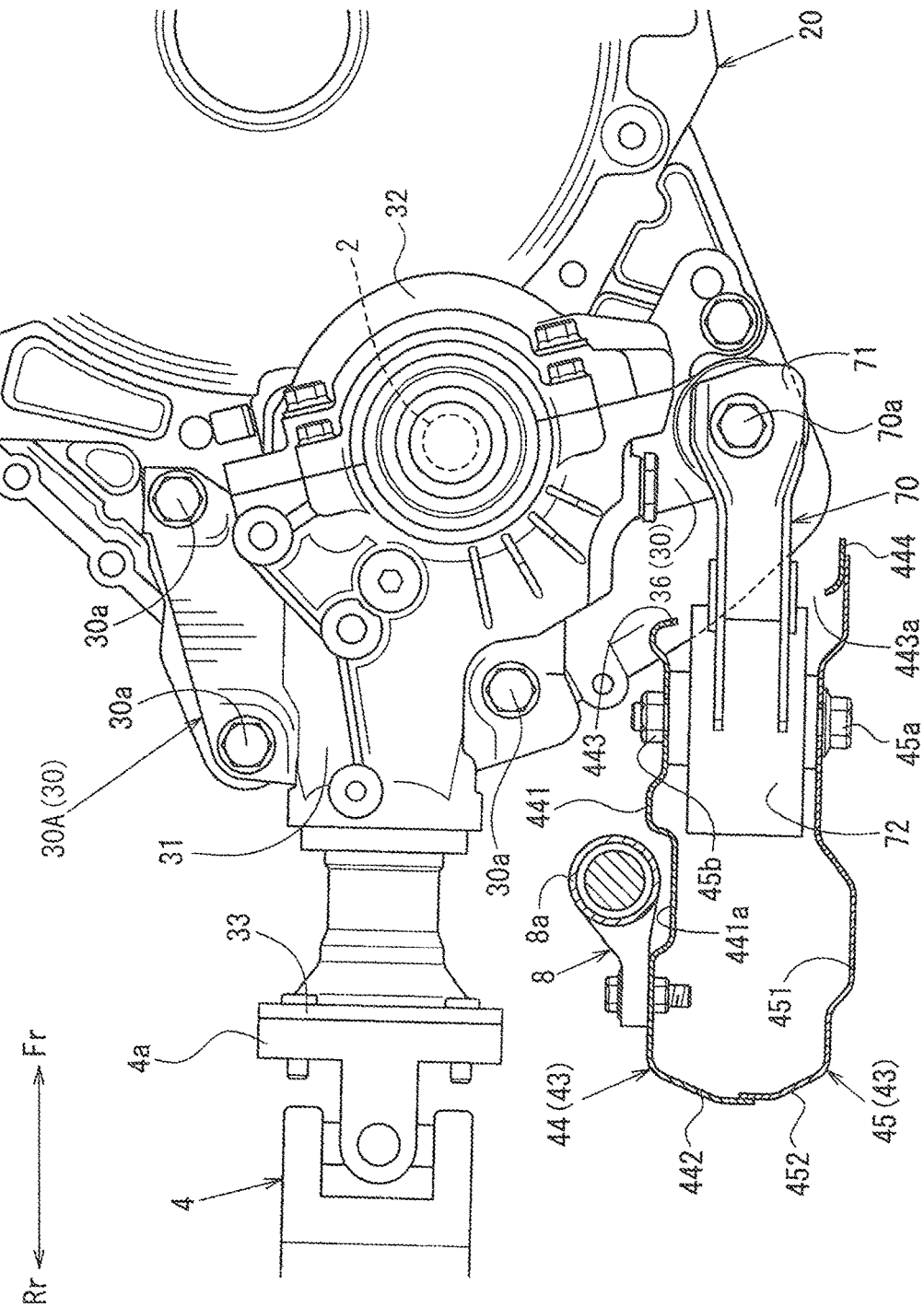
FIG. 6 is an essential part right side view illustrating essential parts of a power train supporting structure in another embodiment.
Figure 7:
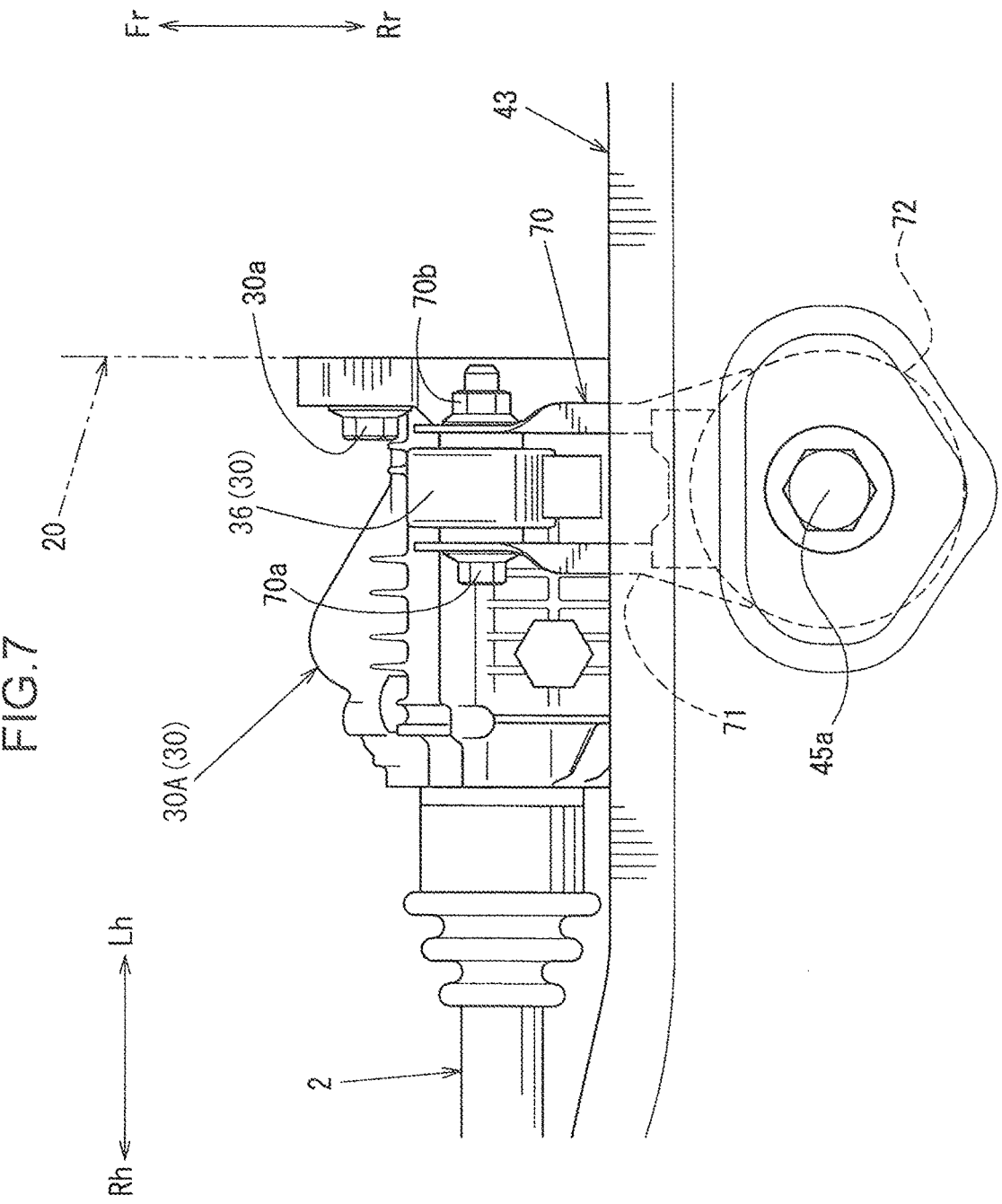
FIG. 7 is an essential part bottom view illustrating essential parts of the power train supporting structure in the another embodiment.
Figure 8:
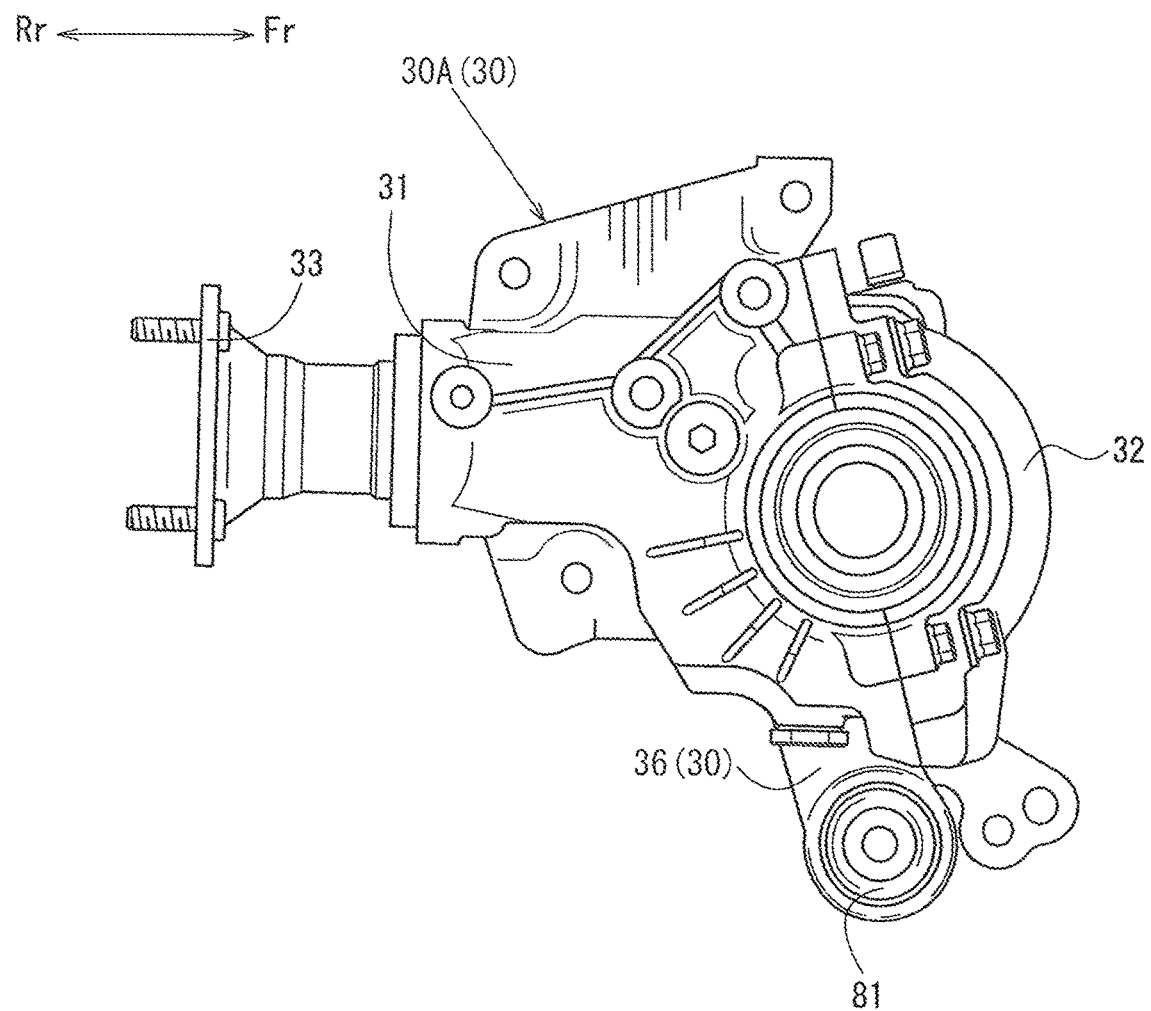
FIG. 8 is a right side view illustrating a transfer in the another embodiment.

For instance, in the power train supporting structure of the first embodiment, the intermediate bracket 80 may be omitted, and a bush press-fitting portion 36 connected to the rear mount bracket 70 may be integrally formed with the transfer case 31. Specifically, in a power train supporting structure as a modification of the first embodiment, as illustrated in FIG. 6 as an essential part right side view, FIG. 7 as an essential part bottom view of the power train supporting structure, and FIG. 8 as a right side view of a transfer 30, a front mount bush 81 is press-fitted in a bush press-fitting portion 36 extending from a lower portion of a transfer case 31 forwardly and downwardly of a vehicle. Specifically, in the modification of the first embodiment, the transfer 30 may include a transfer body 30A; and the bush press-fitting portion 36 which is integrally formed on a lower portion of the transfer body 30A, and in which the front mount bush 81 is press-fitted. The bush press-fitting portion 36 may be connected to a rear mount bracket 70 via the front mount bush 81.

In other words, the rear mount bracket 70 may be connected to the front mount bush 81, which is integrally formed with the transfer 30, specifically, the transfer body 30A without intervening the intermediate bracket 80.

The bush press-fitting portion 36 is formed at such a position that a connection position between the front mount bush 81 of the transfer 30 and the rear mount bracket 70 is substantially equivalent to that in the embodiment.

As well as the first embodiment, also in the power train supporting structure for a vehicle 1 having the aforementioned configuration, it is possible to suppress an influence to a vehicle compartment even when the transfer 30 is provided in the vehicle 1 mounted with a transversely disposed engine 10.

Further, in the power train supporting structure for the vehicle 1, it is possible to suppress an increase in the number of parts, and to connect the rear mount bracket 70 and the transfer 30 via the front mount bush 81 by integrally forming the front mount bush 81 on the transfer 30 (the transfer body 30A).

Second Embodiment

Next, the second embodiment of the present invention is described in the following along with the drawings.

First of all, a power train supporting structure for a vehicle 1 in the embodiment is described in detail using FIG. 1, FIG. 2, and FIG. 9 to FIG. 12B.

The power train supporting structure for the vehicle 1 in the second embodiment is also configured to suppress an influence to a vehicle compartment even when a transfer is provided by specifying a connection position of a rear mount bracket to the transfer as well as the first embodiment.

In addition to the configuration of the first embodiment, in the power train supporting structure for the vehicle 1 in the second embodiment, loosening of a fastening bolt is suppressed to stably support a rear mount bracket.

Specifically, when a rear mount bracket is connected only with a rear portion of a transfer as disclosed in Japanese Unexamined Patent Publication No. 2003-144078, an excessive load may be exerted on the transfer and the rear mount bracket when a power train swings on a bumpy road surface or the like.

As a result, for instance, when contact surfaces between the transfer and the rear mount bracket make a small sliding movement, a fastening bolt for fastening the transfer and the rear mount bracket is likely to be loosened.

In view of the aforementioned inconveniences, an object of the second embodiment is to provide a power train supporting structure for a vehicle, which enables to prevent loosening of a fastening bolt, and to stably support a rear mount bracket.

Figure 9:
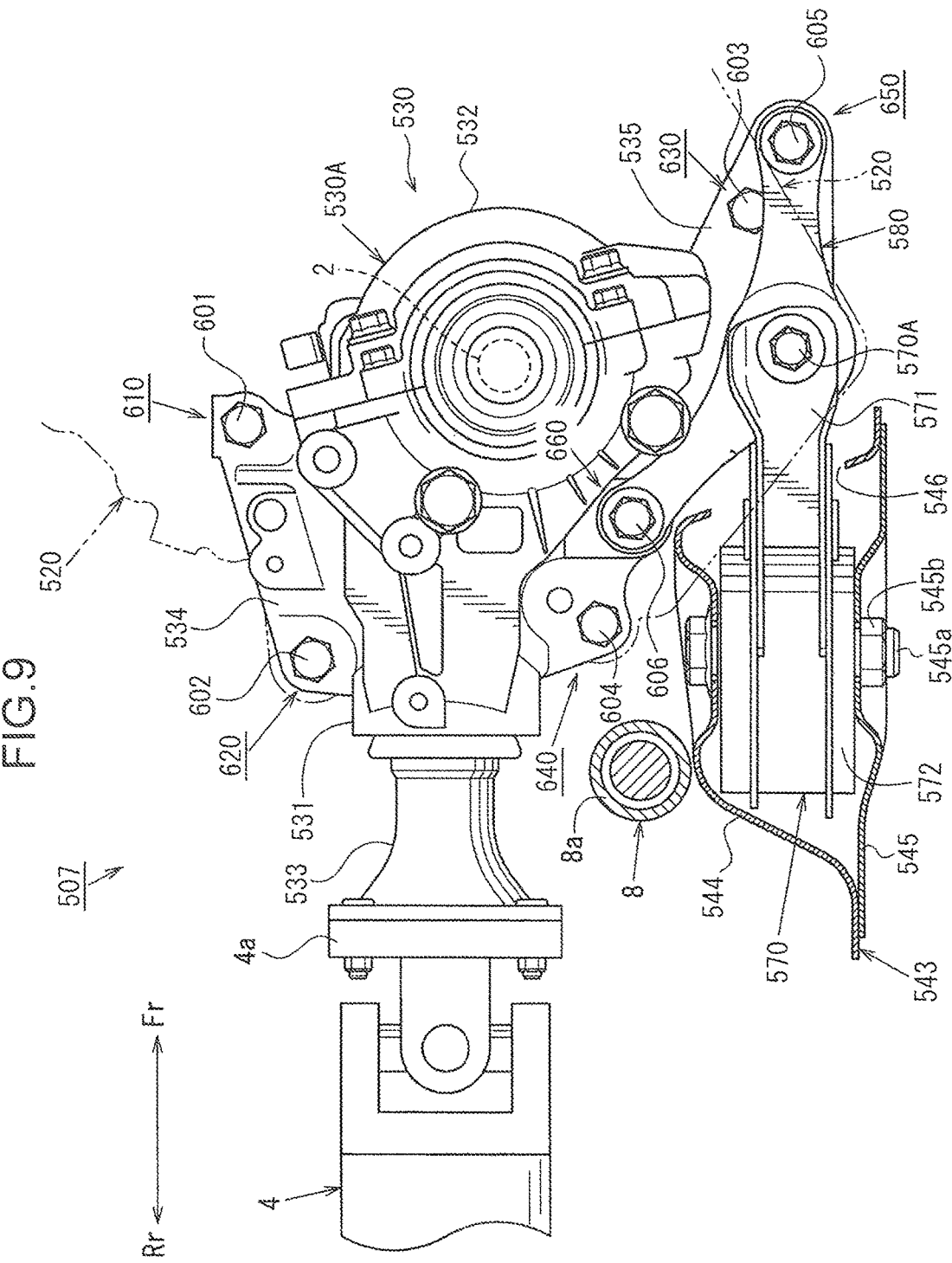
FIG. 9 is an essential part right side view illustrating essential parts of the power train supporting structure when viewed from the right side.
Figure 10:
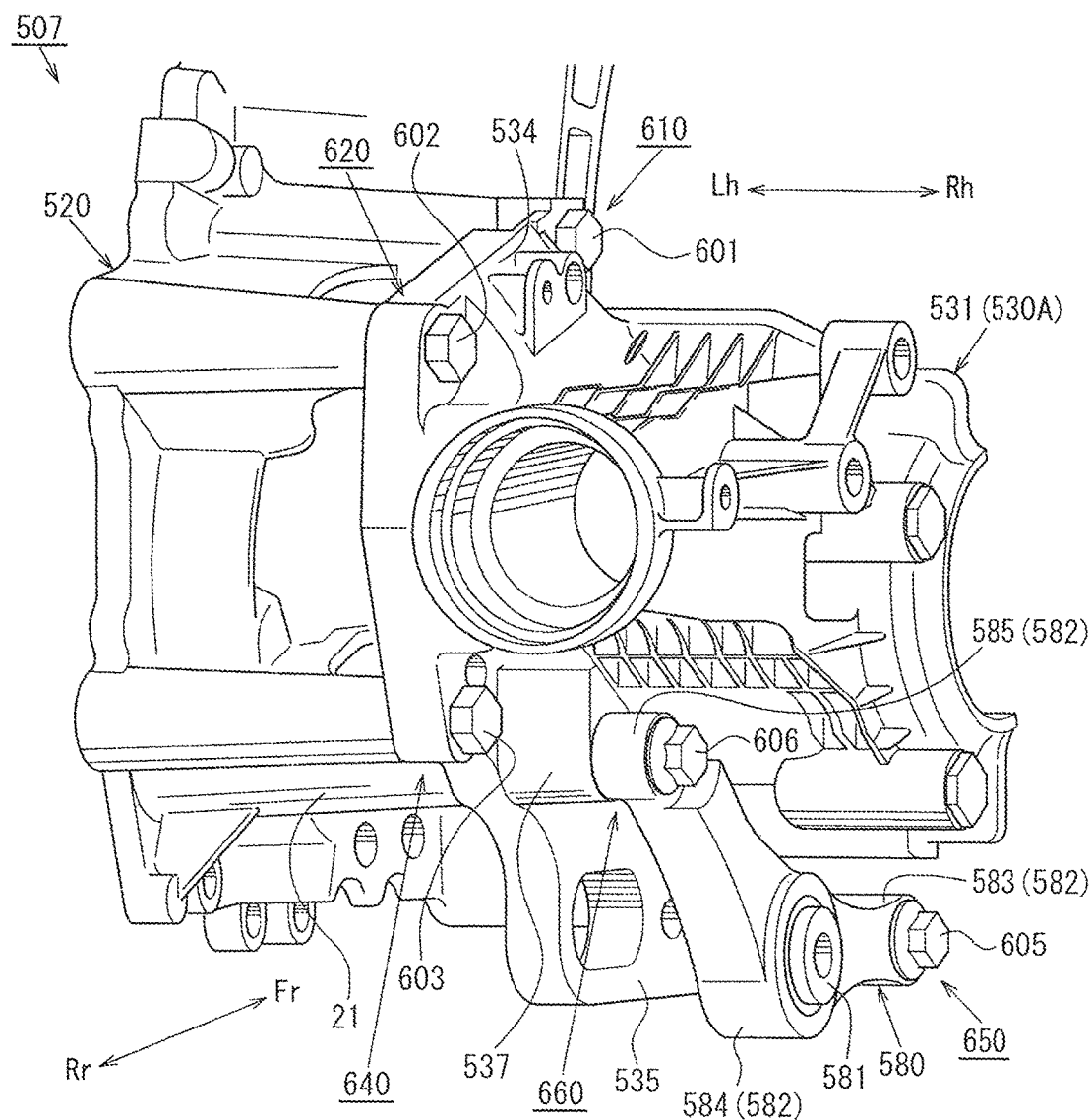
FIG. 10 is an essential part perspective view illustrating essential parts of the power train supporting structure in an assembled state.
Figure 11:
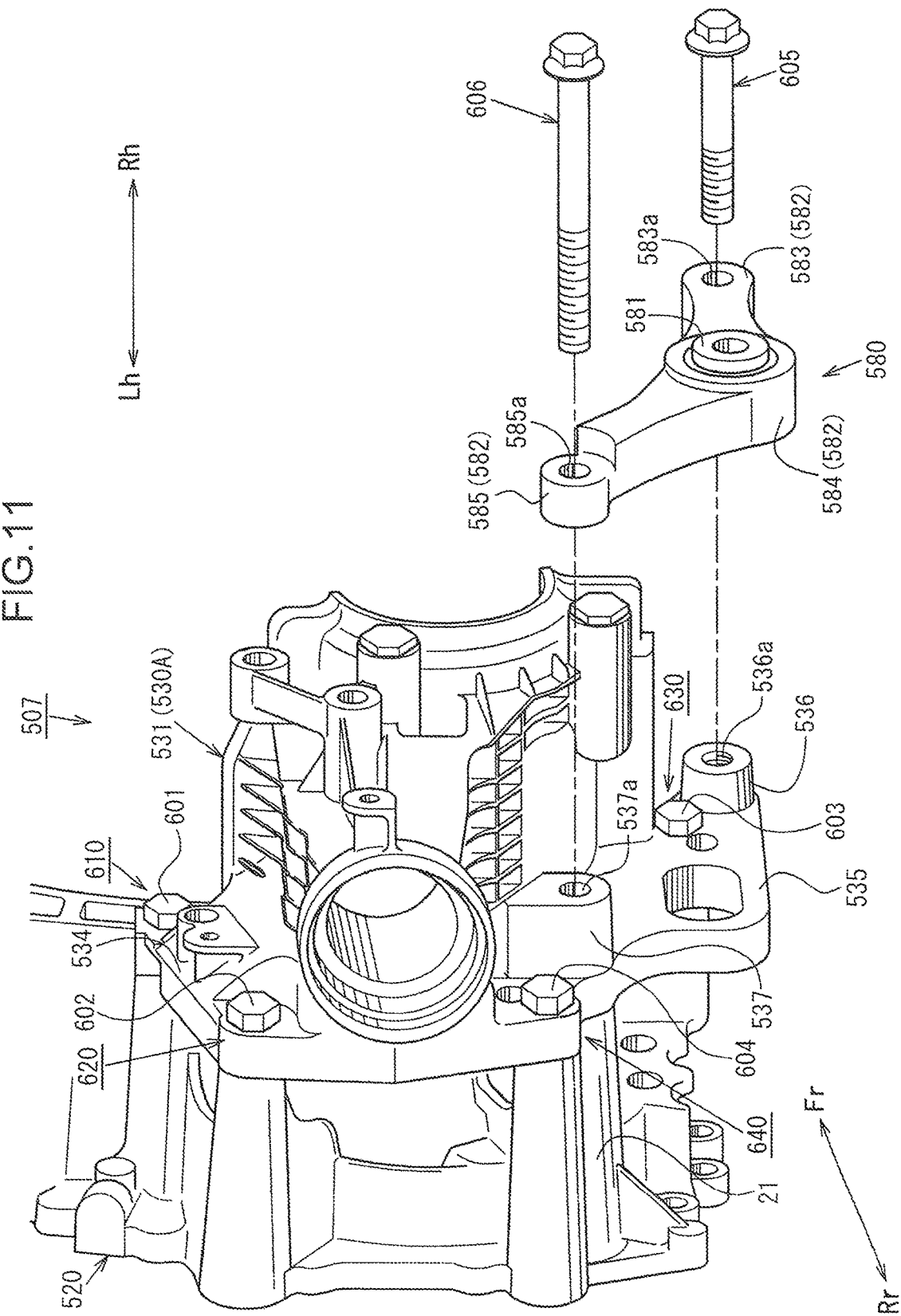
FIG. 11 is an exploded perspective view illustrating a state that an intermediate bracket is removed.
Figure 12A:
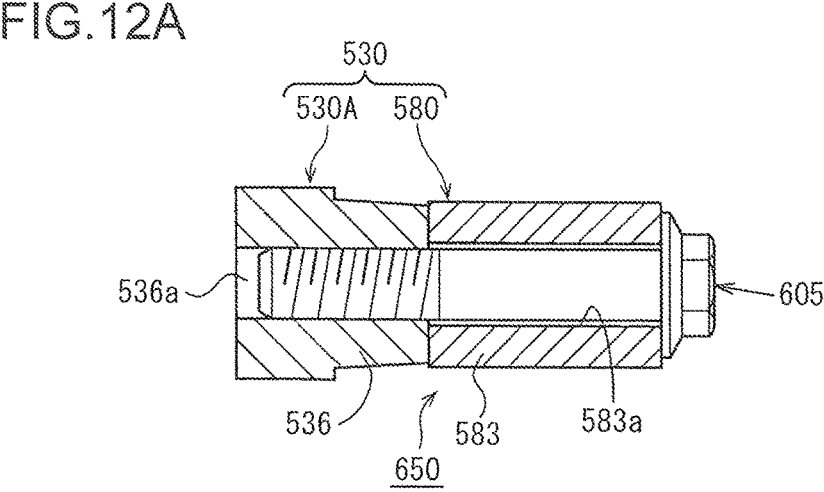
FIGS. 12A and 12B are explanatory diagrams illustrating a front fastener and a rear fastener in cross section taken along the vehicle width direction.
Figure 12B:
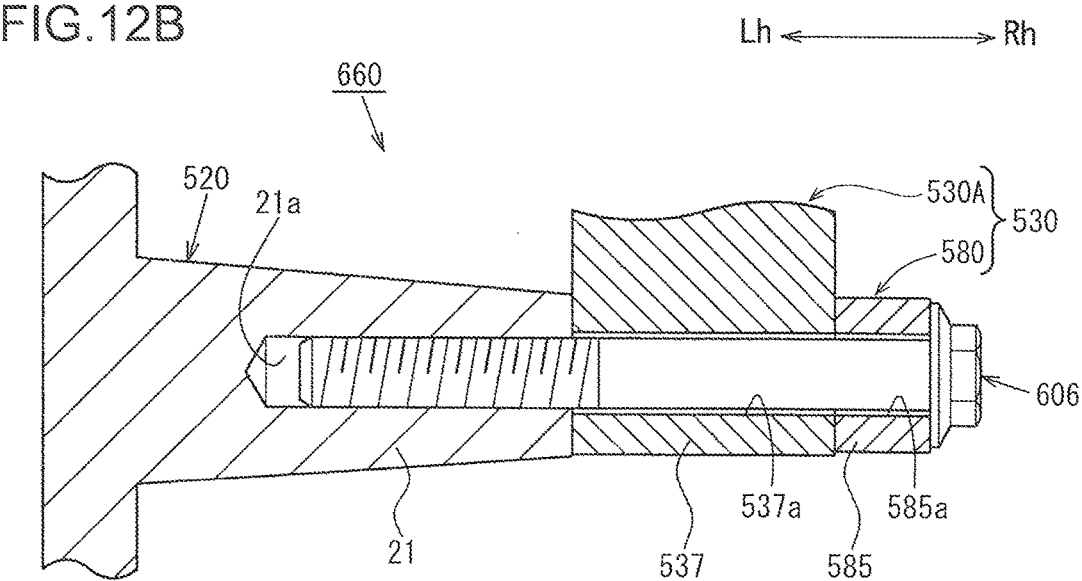

An explanatory diagram showing a configuration of a vehicle 1, and a plan view illustrating an external appearance of a power train 7 are the same as in the first embodiment. Therefore, the second embodiment is described referring to FIG. 1 and FIG. 2 as necessary. In FIG. 1 and FIG. 2, reference numerals included in the brackets are reference numerals of constituent elements to be described in the second embodiment. FIG. 9 is an essential part right side view of the power train supporting structure when viewed from the right side. FIG. 10 is an essential part perspective view of the power train supporting structure in an assembled state. FIG. 11 is an exploded perspective view in a state that an intermediate bracket 80 is removed. FIG. 12A and FIG. 12B are explanatory diagrams illustrating a front fastener 650 and a rear fastener 660 in cross section taken along the vehicle width direction.

Further, in order to clarify illustration of essential parts in FIG. 9, an outer configuration of a transmission 520 is indicated by the two-dotted chain line. In order to clarify illustration in FIG. 10 and FIG. 11, only a transfer case 531 is illustrated out of constituent elements of a transfer 530. Further, regarding FIG. 12A and FIG. 12B, FIG. 12A is a sectional view of the front fastener 650, and FIG. 12B is a sectional view of the rear fastener 660.

A vehicle 501 is a so-called FF-based four-wheel drive vehicle, in which a power train 507 is disposed in a vehicle front portion. As illustrated in FIG. 1, the power train 507 (equivalent to a power plant) is configured to transmit an output of a transversely disposed engine 10 whose crankshaft is aligned with the vehicle width direction to front wheels 3 via drive shafts 2, and to transmit an output of the transversely disposed engine 10 to rear wheels 6 via a propeller shaft 4 and a rear differential gear 5. A layout of the power train 507, and a specific configuration of a steering gear box 8 are the same as in the first embodiment.

A basic configuration of a sub frame 40 is the same except for a specific configuration of a suspension cross member 43. Specifically, the sub frame 40 includes a pair of left and right front-rear members 41, a front cross member 42, and a suspension cross member 543.

As illustrated in FIG. 9, as well as the first embodiment, the suspension cross member 543 in the second embodiment is integrally formed by joining an upper panel 544 located on the vehicle upper side, and a lower panel 545 located on the vehicle lower side one over the other in the vehicle up-down direction.

More specifically, as illustrated in FIG. 9, the upper panel 544 has a hat-like shape in section taken along the vehicle front-rear direction such that the upper panel 544 is opened downwardly of the vehicle.

A bolt opening hole (not illustrated) for receiving a connection bolt 545a in connecting a rear mount bracket 570 to be described later is formed in an upper surface of the upper panel 544 to open in the vehicle up-down direction substantially at a middle of the vehicle 501 in the vehicle width direction.

Further, a bracket insertion hole 546 is formed in a front surface of the upper panel 544 with a size capable of receiving the rear mount bracket 570 to be described later from the vehicle front side.

As illustrated in FIG. 9, the lower panel 545 has a substantially flat plate shape in section taken along the vehicle front-rear direction. A bolt opening hole (not illustrated) for receiving the connection bolt 545a is formed in the lower panel 545 at a position facing the bolt opening hole of the upper panel 544 in the vehicle up-down direction. A welded nut 545b engageable with the connection bolt 545a is attached to the lower panel 545 by welding.

As illustrated in FIG. 2 and FIG. 9, the power train 507 is swingably supported on the vehicle body in a space surrounded by paired left and right front-side frames, and the sub frame 40 via a right mount bracket 50, a left mount bracket 60, and the rear mount bracket 570 disposed on the vehicle rear side than the right mount bracket 50 and the left mount bracket 60, which are disposed from the vehicle right side along the vehicle width direction.

The right mount bracket 50 and the left mount bracket 60 have the same configuration as the mount brackets in the first embodiment, and accordingly, the description thereof is omitted herein.

As illustrated in FIG. 9, the rear mount bracket 570 swingably connects between a rear portion (an intermediate bracket 580 to be described later) of the power train 507, and the suspension cross member 543 substantially at a middle of the vehicle 501 in the vehicle width direction.

More specifically, the rear mount bracket 570 is integrally formed by joining a bracket front portion 571 to be swingably connected to a rear portion of the power train 507 by a connection bolt 570a, and a bracket rear portion 572 to be swingably connected to the suspension cross member 543 by the connection bolt 545a in this order from the vehicle front side.

The bracket front portion 571 has such a configuration that substantially flat plate-shaped metal flat plates having a thickness in the vehicle width direction face each other with a predetermined gap in the vehicle width direction. Further, a bolt insertion hole (not illustrated) for receiving the connection bolt 570a is formed in the metal flat plate of the bracket front portion 571 on the vehicle right side. On the other hand, a welded nut (not illustrated) engageable with the connection bolt 570a is attached to the metal flat plate of the bracket front portion 571 on the vehicle right side by welding.

The bracket rear portion 572 is made by press-fitting a mount bush having an elasticity in a metal tubular member whose axis direction is aligned with the vehicle up-down direction. As illustrated in FIG. 9, the bracket rear portion 572 is connected to the suspension cross member 543 with use of the connection bolt 545a so that the bracket rear portion 572 is held between the upper panel 544 and the lower panel 545.

As illustrated in FIG. 1, FIG. 2, and FIG. 9, the power train 507 to be supported on the vehicle body as described above includes the transversely disposed engine 10 whose crankshaft is aligned with the vehicle width direction, a transmission 520 which outputs an output of the transversely disposed engine 10 to the drive shafts 2, and the transfer 530 which outputs an output of the transmission 520 to the propeller shaft 4.

As illustrated in FIG. 1, the transversely disposed engine 10 is disposed on the right side in the vehicle width direction in a state that an output shaft (a crankshaft) thereof is located on the vehicle left side.

The transmission 520 is disposed on the vehicle left side of the transversely disposed engine 10, and is fixedly connected with the transversely disposed engine 10 in a state that an input shaft of the transmission 520 is substantially coaxial with the output shaft of the transversely disposed engine 10. The transmission 520 outputs an input rotation to the output shaft, which is disposed in parallel to the input shaft at a position below the input shaft on the vehicle rear side, while reducing the input rotation by switching between a plurality of gears.

Note that the transmission 520 is configured such that a boss portion (not illustrated) engageable with a fastening bolt for fastening the transfer 530 is formed to project toward the vehicle right side. Further, as illustrated in FIG. 10 and FIG. 11, the transmission 520 is configured such that a boss portion 21 which communicates with a rear bracket insertion hole 585a of the intermediate bracket 580 to be described later, and including a screw hole 21a (see FIG. 12B) engageable with a rear fastening bolt 606 is formed to project toward the vehicle right side in a state that the transfer 530 is assembled.

Further, the paired left and right drive shafts 2 to be connected to an output shaft of the transmission 520 are disposed substantially coaxial with the output shaft of the transmission 520. Note that the drive shaft 2 to be connected to the front wheel 3 on the vehicle right side is connected to the output shaft of the transmission 520 via the transfer 530.

The transfer 530 is disposed at such a position that an input shaft thereof is located substantially coaxial with the output shaft of the transmission 520 on the vehicle right side. The transfer 530 has a function of outputting an input transmitted from the transmission 520 to the output shaft substantially orthogonal to the input shaft. The transfer 530 includes a transfer body 530A, and the intermediate bracket 580 mounted on a lower portion of the transfer body 530A. The transfer body 530A includes a transfer case 531, a cover 532, a ring gear (not illustrated), a drive pinion (not illustrated), an upper mounting base portion 534, and a lower mounting base portion 535.

More specifically, as illustrated in FIG. 9, the transfer 530 (specifically, the transfer body 530A) includes the transfer case 531 located on the vehicle rear side, and the cover 532 located on the vehicle front side; and is configured to form an inner hollow portion by the transfer case 531 and the cover 532.

The transfer body 530A accommodates a ring gear rotatably supported around a rotational axis aligned with the vehicle width direction; and a drive pinion including a drive pinion gear engageable with the ring gear at a front end of the drive pinion, and serving as an output shaft which is rotatably supported around a rotational axis aligned with the vehicle front-rear direction. Note that a companion flange 33 to be connected to a flange yoke 4a of the propeller shaft 4 is mounted on a rear end of the drive pinion.

As illustrated in FIG. 9 to FIG. 11, the transfer 530 having the aforementioned configuration is fixedly fastened with a right surface of the transmission 520 with use of a plurality of fastening bolts.

More specifically, the substantially flat-plate-shaped upper mounting base portion 534 extending upwardly of the vehicle, and the substantially flat-plate-shaped lower mounting base portion 535 extending downwardly of the vehicle are formed on a portion of the transfer case 531 on the vehicle left side.

As illustrated in FIG. 9 and FIG. 10, the upper mounting base portion 534 is formed to project upwardly of the vehicle in a range from a vicinity of a rear end of the transfer case 531 to a front end thereof in the vehicle front-rear direction when viewed from a side of the vehicle.

A bolt hole (not illustrated) for receiving a first fastening bolt 601 engageable with the transmission 520 is formed in the vicinity of a front end of the upper mounting base portion 534. Note that a fastener between the transmission 520 and the transfer 530 (specifically, the transfer body 530A) to be fastened with use of the first fastening bolt 601 is referred to as a first fastener 610.

Further, a bolt hole (not illustrated) for receiving a second fastening bolt 602 engageable with the transmission 520 is formed in the vicinity of a rear end of the upper mounting base portion 534. A fastener between the transmission 520 and the transfer 530 (specifically, the transfer body 530A) to be fastened with use of the second fastening bolt 602 is referred to as a second fastener 620.

As illustrated in FIG. 9 and FIG. 11, the lower mounting base portion 535 is formed into a shape such that a rear end thereof is located in the vicinity of a rear end of the transfer case 531, and a front end thereof projects downwardly and forwardly of the vehicle than a front end of the transfer case 531.

A bolt hole (not illustrated) for receiving a third fastening bolt 603 engageable with the transmission 520 is formed in the vicinity of a front end of the lower mounting base portion 535. Note that a fastener between the transmission 520 and the transfer 530 (specifically, the transfer body 530A) to be fastened with use of the third fastening bolt 603 is referred to as a third fastener 630.

Further, a bolt hole (not illustrated) for receiving a fourth fastening bolt 604 engageable with the transmission 520 is formed in the vicinity of a rear end of the lower mounting base portion 535. A fastener between the transmission 520 and the transfer 530 (specifically, the transfer body 530A) to be fastened with use of the fourth fastening bolt 604 is referred to as a fourth fastener 640.

In addition to the above, as illustrated in FIG. 10 and FIG. 11, a front bracket mounting portion 536 and a rear bracket mounting portion 537 on which the intermediate bracket 580 to be described later is mounted are formed on the lower mounting base portion 535 of the transfer 530, specifically, the transfer body 530A.

As illustrated in FIG. 11, the front bracket mounting portion 536 is integrally formed with the lower mounting base portion 535 to stand upright toward the vehicle right side on the vehicle front side than the third fastener 630. As illustrated in FIG. 11 and FIG. 12A, the front bracket mounting portion 536 includes a flat surface in contact with the intermediate bracket 580 on the vehicle right side, and includes a screw hole 536a engageable with the front fastening bolt 605 along the vehicle width direction.

As illustrated in FIG. 9 to FIG. 11, the rear bracket mounting portion 537 is integrally formed with the lower mounting base portion 535 to stand upright from a vicinity of the fourth fastener 640 toward the vehicle right side on an upper portion of the lower mounting base portion 535 at a position between the third fastener 630 and the fourth fastener 640. Specifically, the rear bracket mounting portion 537 is formed on the transfer case 531 in the vicinity of the output shaft of the transfer to be connected to the propeller shaft 4.

As illustrated in FIG. 11 and FIG. 12B, the rear bracket mounting portion 537 is configured such that a portion thereof on the vehicle left side comes into contact with the boss portion 21 of the transmission 520, and that a portion thereof on the vehicle right side comes into contact with the intermediate bracket 580.

Further, a transfer insertion hole 537a communicating with the screw hole 21a of the boss portion 21 of the transmission 520 in the vehicle width direction, and configured to receive the rear fastening bolt 606 is formed in the rear bracket mounting portion 537.

As illustrated in FIG. 9 to FIG. 11, the intermediate bracket 580 includes a substantially cylindrical mount bush 581 whose axis direction is aligned with the vehicle width direction, and a bracket body 582 made of aluminum alloy and having a predetermined thickness in the vehicle width direction.

Although detailed illustration is omitted, the mount bush 581 is constituted by a small-diameter tubular member having an inner diameter capable of receiving the connection bolt 570a, a large-diameter tubular member whose diameter is larger than the diameter of the small-diameter tubular member, and synthetic rubber having an elasticity and filled in a gap between the small-diameter tubular member and the large-diameter tubular member, which are coaxially disposed in such a manner that peripheral surfaces thereof face each other.

The bracket body 582 is configured such that a substantially cylindrical front end portion 583 extending in the vehicle width direction, a middle portion 584, and a rear end portion 585 are disposed in this order from the vehicle front side; and that the front end portion 583, the middle portion 584, and the rear end portion 585 are connected to each other into a substantially V-shape in side view.

As illustrated in FIG. 11 and FIG. 12A, the front end portion 583 is formed into a shape including a front bracket insertion hole 583a for receiving the front fastening bolt 605, and communicating with a screw hole 536a of the front bracket mounting portion 536 of the transfer 530.

Specifically, the front end portion 583 of the intermediate bracket 580 is fixedly connected with the front bracket mounting portion 536 of the transfer 530 (specifically, the transfer body 530A) in a state that the transfer 530 is fastened with the transmission 520. The fastener is referred to as the front fastener 650 (see FIG. 9 and FIG. 10).

The middle portion 584 is formed into a substantially cylindrical shape having a diameter larger than the outer diameter of the front end portion 583, and having an inner diameter for allowing press-fit of the mount bush 581. Note that the middle portion 584 is disposed in the vicinity of a position which is below the drive shaft 2, and which is in the vehicle up-down directional an area that faces a lower end portion of the transmission 520 and that is an overlapping of the transmission 520 and the transfer 530 in view of the vehicle width direction. In other words, the middle portion 584 is formed in the vicinity of a position which is below the drive shaft 2, and which is on substantially the same as the position of the drive shaft 2 in the vehicle front-rear direction, and which is in the vehicle up-down directional area that faces a lower end portion of the transmission 520, and that is an overlapping of the transmission 520 and the transfer 530 (the transfer body 530A) in view of the vehicle width direction.

In other words, as illustrated in FIG. 9, the intermediate bracket 580 is formed at a position at which the connection position between the transfer 530 and the rear mount bracket 570 coincides with the position of the drive shaft 2 in the vehicle front-rear direction, and which is below the drive shaft 2, and which is in the vehicle up-down directional area that faces a lower end portion of the transmission 520 and is an overlapping of the transmission 520 and the transfer 30 in view of the vehicle width direction.

On the other hand, the rear mount bracket 570 and the intermediate bracket 580 has such a configuration as to allow the transfer 530 and the rear mount bracket 570 to be connected at a position which is on the vehicle front side than the suspension cross member 543 and at a lower position of the drive shaft 2.

As illustrated in FIG. 11 and FIG. 12B, the rear end portion 585 is formed into a shape including the rear bracket insertion hole 585a which receives the rear fastening bolt 606 at an upper position than the middle portion 584 on the vehicle rear side, and which communicates with the transfer insertion hole 537a of the rear bracket mounting portion 537 of the transfer 530, and with the screw hole 21a of the boss portion 21 of the transmission 520.

Specifically, the rear end portion 585 of the intermediate bracket 580 is fixedly fastened with the boss portion 21 of the transmission 520 with interposing the rear bracket mounting portion 537 of the transfer 530 in a state that the transfer 530 is connected with the transmission 520.

In the power train supporting structure for the vehicle 501, the rear fastener 660 (see FIG. 9 and FIG. 10) which commonly fastens the transmission 520, the transfer 530, and the intermediate bracket 580 is constituted by the screw hole 21a of the transmission 520, the transfer insertion hole 537a of the transfer 530, the rear bracket insertion hole 585a of the intermediate bracket 580, and the rear fastening bolt 606.

In the power train supporting structure for the vehicle 501 which implements the aforementioned configuration, as well as the first embodiment, it is possible to suppress an influence to a vehicle compartment even when the transfer 530 is provided in the vehicle 501 mounted with the transversely disposed engine 10. Further, in addition to the above, in the power train supporting structure for the vehicle 501 in the second embodiment, it is possible to prevent loosening of the rear fastening bolt 606, and to stably support the rear mount bracket 570.

Specifically, in the power train supporting structure for the vehicle 501, it is possible to connect the transfer 530 and the rear mount bracket 570 appropriately for each type of vehicle without forming the transfer case 531 separately by connecting the transfer 530 and the rear mount bracket 570 via the intermediate bracket 580.

Further, the transmission 520, the transfer 530, and the intermediate bracket 580 are commonly fastened by the rear fastener 660. Therefore, in the power train supporting structure for the vehicle 501, it is possible to transmit a load exerted on the intermediate bracket 580 to the transmission 520 via the rear fastening bolt 606 when the power train 507 swings on a bumpy road surface or the like.

According to the aforementioned configuration, in the power train supporting structure for the vehicle 501, for instance, it is possible to suppress a small sliding movement on contact surfaces between the transfer 530 and the intermediate bracket 580, and to prevent loosening of the rear fastening bolt 606. Further, in the power train supporting structure for the vehicle 501, it is possible to reduce a load exerted on the transfer 530. Therefore, it is possible to prevent damage or breakage of the transfer 530.

As described above, in the power train supporting structure for the vehicle 501, it is possible to prevent loosening of the rear fastening bolt 606, and to stably support the rear mount bracket 570 by providing the rear fastener 660 which commonly fastens the transmission 520, the transfer 530, and the intermediate bracket 580.

Further, in the power train supporting structure for the vehicle 501, it is possible to prevent loosening of the rear fastening bolt 606, and to secure a stable support state of the rear mount bracket 570 by disposing the rear fastener 660 between the third fastener 630 and the fourth fastener 640 adjacent to each other when viewed from a side of the vehicle.

Specifically, an area between the third fastener 630 and the fourth fastener 640 adjacent to each other when viewed from a side of the vehicle has a relatively high rigidity. Therefore, the area is less likely to be flexed or deformed when a load is exerted thereto.

Therefore, in the power train supporting structure for the vehicle 501, it is possible to increase rigidity in the vicinity of the boss portion 21 of the transmission 520 by disposing the rear fastener 660 between the third fastener 630 and the fourth fastener 640 adjacent to each other.

According to the aforementioned configuration, in the power train supporting structure for the vehicle 501, it is possible to increase supporting rigidity of the intermediate bracket 580 in a fastening state. Thus, the power train supporting structure for the vehicle 501 is advantageous in preventing loosening of the rear fastening bolt 606.

Therefore, the power train supporting structure for the vehicle 501 is advantageous in securely preventing loosening of the rear fastening bolt 606, and in securing a stable support state of the rear mount bracket 570 by disposing the rear fastener 660 between the third fastener 630 and fourth fastener 640 adjacent to each other.

Further, in the power train supporting structure for the vehicle 501, it is possible to prevent loosening of the rear fastening bolt 606, and to reduce gear noise, which may be transmitted to the vehicle body via the rear mount bracket 570 by disposing the rear fastener 660 in the vicinity of the output shaft of the transfer 530 to be connected to the propeller shaft 4 when viewed from a side of the vehicle.

Specifically, the transfer 530 outputs an output of the transmission 520 to the propeller shaft 4 connected to the drive pinion via a ring gear and the drive pinion gear.

In this case, gear noise generated by meshing of teeth between a pair of gears may be transmitted to the vehicle body inside the transfer 530 via the transfer case 531 for pivotally supporting the drive pinion 538, and the rear mount bracket 570. As a result, a passenger may feel annoyed with gear noise transmitted to the vehicle compartment.

In view of the above, in the power train supporting structure for the vehicle 501, it is possible to transmit gear noise in a dispersed manner to a transmission path along which gear noise is transmitted to the vehicle body via the transfer case 531 and the rear mount bracket 570, and to a transmission path along which gear noise is transmitted to the transmission 520 via the transfer case 531 and the rear fastening bolt 606 by providing the rear fastener 660.

In this case, the rear fastener 660 is disposed in the vicinity of the output shaft of the transfer 530. Therefore, in the power train supporting structure for the vehicle 501, it is easy to transmit gear noise to the transmission 520 side, as compared with a configuration, in which a rear fastener 660 is disposed at a position away from an output shaft of a transfer.

According to the aforementioned configuration, in the power train supporting structure for the vehicle 501, it is possible to reduce gear noise, which may be transmitted from the vehicle body to the vehicle compartment via the rear mount bracket 570. This is advantageous in reducing discomfort to a passenger.

Therefore, in the power train supporting structure for the vehicle 501, it is possible to prevent loosening of the rear fastening bolt 606, and to reduce gear noise, which may be transmitted to the vehicle body via the rear mount bracket 570, by disposing the rear fastener 660 in the vicinity of the output shaft of the transfer 530.

Note that in the embodiment, the intermediate bracket 580 includes the mount bush 581. The embodiment, however, is not limited to the above. The intermediate bracket 580 may exclude a mount bush. In this case, the bracket front portion 571 of the rear mount bracket 570 may include a mount bush having an elasticity.

Further, the rear mount bracket 570 is connected to the suspension cross member 543. The embodiment, however, is not limited to the above. The rear mount bracket 570 may be connected to a frame member such as a frame constituting a vehicle body, or a reinforcement member such as a cross member for reinforcing the frame member.

Further, the transfer 530 (the transfer body 530A) and the intermediate bracket 580 are fastened with each other at two positions with use of the front fastening bolt 605 and the rear fastening bolt 606. The embodiment, however, is not limited to the above. The transfer 530 (the transfer body 530A) and the intermediate bracket 580 may be fastened with each other at three or more positions.

Further, the power train supporting structure for the vehicle 501 includes the one rear fastener 660 for commonly fastening the transmission 520, the transfer 530 (the transfer body 530A), and the intermediate bracket 580. The embodiment, however, is not limited to the above. The transmission 520, the transfer 530 (the transfer body 530A), and the intermediate bracket 580 may be commonly fastened at two or more positions.

For instance, regarding the front fastener 650, the front fastening bolt 605 may be engaged in a boss portion of the transmission 520; and the transmission 520, the transfer 530 (the transfer body 530A), and the intermediate bracket 580 may be commonly fastened by the front fastener 650 and the rear fastener 660. In this case, the third fastener 630 is disposed between the front fastener 650 and the rear fastener 660.

According to the aforementioned configuration, the power train supporting structure for the vehicle 501 is advantageous in securely preventing loosening of the front fastening bolt 605 and the rear fastening bolt 606, and in securing a stable fastening state between the transmission 520 and the transfer 530.

Specifically, in the power train supporting structure for the vehicle 501, it is possible to transmit a load exerted on the intermediate bracket 580 in a dispersed manner to the transmission 520 via the front fastening bolt 605 and the rear fastening bolt 606 by providing the front fastener 650 and the rear fastener 660.

According to the aforementioned configuration, the power train supporting structure for the vehicle 501 is advantageous in securely preventing loosening of the front fastening bolt 605 and the rear fastening bolt 606, and in securely preventing damage or breakage of the transfer 530.

Further, in the power train supporting structure for the vehicle 501, it is possible to reduce a load to be transmitted to the transmission 520 via the transfer 530 and the third fastener 630 by transmitting a load exerted on the intermediate bracket 580 in a dispersed manner to the transmission 520 via the front fastening bolt 605 and the rear fastening bolt 606. Therefore, the power train supporting structure for the vehicle 501 is advantageous in preventing loosening of the third fastening bolt 603 at the third fastener 630.

Therefore, the power train supporting structure for the vehicle 501 is advantageous in securely preventing loosening of the front fastening bolt 605 and the rear fastening bolt 606, and in securing a stable fastening state between the transmission 520 and the transfer 530 by disposing the front fastener 650 and the rear fastener 660 for commonly fastening the transmission 520, the transfer 530 (the transfer body 530A), and the intermediate bracket 580, and by disposing the third fastener 630 between the front fastener 650 and the rear fastener 660.

Note that in the embodiment, the third fastener 630 is disposed between the front fastener 650 and the rear fastener 660. The embodiment, however, is not limited to the above. A plurality of fasteners may be disposed between the front fastener 650 and the rear fastener 660.

Regarding the correspondence between the configuration of the present invention, and the aforementioned embodiment, a vehicle body according to the present invention corresponds to the suspension cross member 543 in the embodiment.

Likewise, a front portion of a rear mount bracket corresponds to the bracket front portion 571;

a fastening bolt corresponds to the rear fastening bolt 606;

a bracket insertion hole corresponds to the rear bracket insertion hole 585a;

a common fastener corresponds to the rear fastener 660;

a fastener corresponds to the first fastener 610, the second fastener 620, the third fastener 630, and the fourth fastener 640;

adjacent fasteners correspond to the third fastener 630 and the fourth fastener 640; and adjacent common fasteners correspond to the front fastener 650 and the rear fastener 660.

The present invention, however, is not limited to the configuration of the embodiment, but may include many other embodiments.

Lastly, the following is a summary of the features disclosed in the first and second embodiments, and the advantageous effects based on the features.

The present invention is directed to a power train supporting structure for a vehicle. The power train supporting structure is provided with: a power train including a transversely disposed engine whose rotational axis is aligned with a vehicle width direction, a transmission which transmits an output of the transversely disposed engine to front wheels via a drive shaft, and a transfer which transmits an output of the transmission to rear wheels via a propeller shaft; and a rear mount bracket which connects between a rear portion of the power train and a vehicle body, and which swingably and resiliently supports the power train. A front portion of the rear mount bracket is connected to the transfer at a position which is below the drive shaft and is in a vehicle up-down directional area that is an overlapping of the transmission and the transfer in view of the vehicle width direction.

According to the present invention, in a vehicle mounted with a transversely disposed engine, it is possible to suppress an influence to a vehicle compartment by effectively using a dead space below a drive shaft even when a transfer is provided.

Specifically, in the power train supporting structure for a vehicle, it is possible to dispose the rear mount bracket with respect to the vehicle body on the vehicle front side by connecting the rear mount bracket to the transfer at a position below the drive shaft.

Further, in the power train supporting structure for a vehicle, it is easy to dispose the rear mount bracket with respect to the vehicle body on the vehicle lower side by connecting the front portion of the rear mount bracket to the transfer at a position which is in the vehicle up-down directional area that is an overlapping of the transmission and the transfer in view of the vehicle width direction.

According to the aforementioned configuration, in the power train supporting structure for a vehicle, it is possible to lower the disposing position of the power train to the vehicle body on the vehicle lower side. Therefore, for a vehicle type having a front-wheel drive vehicle and a four-wheel drive vehicle, the power train supporting structure for a vehicle makes it possible to easily set a connection position between a rear mount bracket and a transmission in the front-wheel drive vehicle, and a connection position between a rear mount bracket and a transfer in the four-wheel drive vehicle to the substantially same position.

In other words, for a vehicle type having a front-wheel drive vehicle and a four-wheel drive vehicle, the power train supporting structure for a vehicle makes it possible to set the total height of the front-wheel drive vehicle and the total height of the four-wheel drive vehicle substantially equal to each other.

Further, in the power train supporting structure for a vehicle, it is possible to prevent a floor panel and a dashboard panel from bulging into a vehicle compartment, and to prevent an increase in the size of a floor tunnel for passing a propeller shaft by setting the disposing position of the power train to the vehicle body on the vehicle lower side.

Therefore, in the power train supporting structure for a vehicle, it is possible to lower the disposing position of the power train to the vehicle body on the vehicle lower side, and to suppress an influence to a vehicle compartment even when a transfer is provided.

As an aspect of the present invention, the rear mount bracket may include a rear mount bush at a rear portion thereof, the rear mount bush having an elasticity and including a bolt insertion hole for passing a connection bolt engageable with the vehicle body along the vehicle up-down direction.

According to the present invention, in the power train supporting structure for a vehicle, it is possible to suppress interference with an element on the vehicle body side even when the disposing position of the power train to the vehicle body is lowered.

Specifically, for instance, when a rear mount bracket including a rear mount bush for passing a connection bolt in the vehicle width direction is connected to a suspension cross member, it is necessary to dispose a member-side bracket for supporting the rear mount bracket on the upper surface of the suspension cross member.

Further, in the case of a substantially cylindrical rear mount bush, the length of a rear mount bracket in the vehicle up-down direction tends to increase depending on the outer diameter of the rear mount bush. As a result, the height of a member-side bracket may increase. In this case, when the disposing position of the power train to the vehicle body is lowered, a transfer or a propeller shaft may interfere with the member-side bracket.

On the other hand, in the power train supporting structure for the vehicle, it is possible to suppress an increase in the length of the rear mount bracket in the vehicle up-down direction by providing the rear mount bush for passing the connection bolt in the vehicle up-down direction on the rear mount bracket.

For instance, in the case of a substantially cylindrical rear mount bush, the axial length of the rear mount bush tends to be short, as compared with a radial length of the rear mount bush. Therefore, the rear mount bracket configured such that the connection bolt is received in the rear mount bush in the vehicle up-down direction is advantageous in suppressing an increase in the length in the vehicle up-down direction, as compared with a configuration, in which a connection bolt is received in the vehicle width direction.

According to the aforementioned configuration, in the power train supporting structure for a vehicle, it is possible to suppress an increase in the thickness of a connection portion connected to the rear portion of the rear mount bracket, as compared with a configuration, in which a connection bolt is received in the vehicle width direction.

Therefore, in the power train supporting structure for a vehicle, it is possible to prevent interference of the transfer or the propeller shaft with an element on the vehicle body side even when the disposing position of the power train to the vehicle body is lowered by providing the rear mount bush, which is configured such that the connection bolt is received in the vehicle up-down direction.

Further, as an aspect of the present invention, the power train supporting structure for a vehicle may further include: a cross member extending in the vehicle width direction on a vehicle rear side than the drive shaft, and on a vehicle lower side than the propeller shaft; and a steering gear box to be connected with the front wheels in such a manner that the front wheels are steerable, and fixed to the cross member. The cross member may include a groove portion extending in the vehicle width direction and is recessed toward the vehicle lower side. The steering gear box may be disposed in the groove portion of the cross member.

According to the present invention, the power train supporting structure for a vehicle is advantageous in lowering the disposing position of the power train to the vehicle body further on the vehicle lower side.

Specifically, in a vehicle mounted with a transversely disposed engine, it is often the case that a steering gear box is mounted on the vehicle rear side than a power train. Therefore, when the disposing position of the power train to the vehicle body is lowered, for instance, a rear end of a transfer or a propeller shaft may interfere with the steering gear box.

In view of the above, in the power train supporting structure for a vehicle, it is possible to lower the disposing position of the steering gear box to the vehicle body on the vehicle lower side by disposing the steering gear box in the groove portion formed in the cross member. In other words, the power train supporting structure for a vehicle is advantageous in lowering the disposing position of the power train to the vehicle body further on the vehicle lower side without interference between the power train and the steering gear box.

Further, for a vehicle type having a front-wheel drive vehicle and a four-wheel drive vehicle, the power train supporting structure for a vehicle makes it possible to set the disposing position of the steering gear box to the vehicle body to the substantially same position between the front-wheel drive vehicle and the four-wheel drive vehicle. Therefore, the power train supporting structure for a vehicle is advantageous in suppressing a difference in the disposing position of the power train to the vehicle body between a front-wheel drive vehicle and a four-wheel drive vehicle, and in increasing the ratio of common components.

In addition to the above, in the power train supporting structure for a vehicle, it is possible to make a geometry on suspension-related components common to a front-wheel drive vehicle and a four-wheel drive vehicle, for instance, by setting the disposing position of the power train and the disposing position of the steering gear box to the vehicle body to a substantially same position between the front-wheel drive vehicle and the four-wheel drive vehicle.

Therefore, in the power train supporting structure for a vehicle, it is possible to lower the disposing position of the power train to the vehicle body further on the vehicle lower side, and it is easy to design a vehicle type having a front-wheel drive vehicle and a four-wheel drive vehicle by disposing the steering gear box in the groove portion of the cross member.

Further, as an aspect of the present invention, the transfer may include a transfer body, and an intermediate bracket lying between the transfer body and the front portion of the rear mount bracket, and mounted on the transfer body. The intermediate bracket may include a front mount bush having an elasticity and connected to the front portion of the rear mount bracket.

According to the present invention, in the power train supporting structure for a vehicle, it is easy to interpose the front mount bush without forming the transfer, specifically, the transfer body separately.

Specifically, even in a vehicle mounted with a transversely disposed engine, the size of a front mount bush is likely to differ between vehicle types. Therefore, if a front mount bush is integrally formed with a transfer body, it is necessary to provide a modified transfer case for each vehicle type.

On the other hand, in the power train supporting structure for a vehicle, it is possible to connect the transfer body and the rear mount bracket via the front mount bush appropriately for each type of vehicle without forming the transfer case (the transfer body) separately by forming the intermediate bracket independently of the transfer body and by forming the front mount bush on the intermediate bracket.

Therefore, in the power train supporting structure for a vehicle, it is easy to interpose the front mount bush without forming the transfer, specifically, the transfer body separately by connecting the transfer body and the rear mount bracket via the intermediate bracket.

Further, as an aspect of the present invention, the transfer may include a transfer body, and a front mount bush having an elasticity and formed integrally with the transfer body. The front portion of the rear mount bracket and the transfer body may be connected via the front mount bush.

According to the present invention, in the power train supporting structure for a vehicle, it is possible to suppress an increase in the number of parts, and to connect the rear mount bracket and the transfer body via the front mount bush.

Further, as an aspect of the present invention, the power train supporting structure for a vehicle may further include: an engine-side mount bracket which swingably and resiliently supports the transversely disposed engine with respect to the vehicle body; and a transmission-side mount bracket which swingably and resiliently supports the transmission with respect to the vehicle body. The rear mount bracket may be disposed substantially at a middle of the vehicle body in the vehicle width direction. The engine-side mount bracket and the transmission-side mount bracket may suspend the power train in a front of and above the front portion of the rear mount bracket in the vehicle.

The engine-side mount bracket may be constituted by a mount bracket such as a vehicle-body-side bracket, an elastic member having an elasticity, and an engine-side bracket.

The transmission-side mount bracket may be constituted by a mount bracket such as a vehicle-body-side bracket, an elastic member having an elasticity, and a transmission-side bracket.

According to the present invention, in the power train supporting structure for a vehicle, it is possible to support the power train as a heavy member in a well-balanced manner, and to suppress an influence to a vehicle compartment.

Specifically, for a vehicle type having a front-wheel drive vehicle and a four-wheel drive vehicle, a gravity center of a power train in the front-wheel drive vehicle and a gravity center of a power train in the four-wheel drive vehicle are liable to differ from each other due to a difference in constituent components.

Therefore, when the rear mount bracket is disposed in alignment with a gravity center, the position of a rear mount bracket in the vehicle width direction is likely to differ between a front-wheel drive vehicle and a four-wheel drive vehicle.

In view of the above, in the power train supporting structure for a vehicle, it is possible to support the power train of a front-wheel drive vehicle, and the power train of a four-wheel drive vehicle substantially at a same position by disposing the rear mount bracket substantially at a middle of the vehicle in the vehicle width direction.

In this case, an imaginary line connecting the engine-side mount bracket, the transmission-side mount bracket, and the rear mount bracket forms a substantially triangle in plan view. Therefore, in the power train supporting structure for a vehicle, it is possible to support the power train in a well-balance manner.

As described above, in the power train supporting structure for a vehicle, it is possible to support the power train as a heavy member in a well-balanced manner, and to suppress an influence to a vehicle compartment by causing the engine-side mount bracket, the transmission-side mount bracket, and the rear mount bracket to swingably support the power train.

Further, as an aspect of the present invention, the transfer and the transmission may be fastened with each other at a plurality of positions. The transfer may include a transfer body, and an intermediate bracket which connects between the front portion of the rear mount bracket and the transfer body. The intermediate bracket may include at least one bracket insertion hole for receiving a fastening bolt in connecting the transfer body. The transfer body may include at least one transfer insertion hole for receiving the fastening bolt. The transmission may include a boss portion which communicates with the bracket insertion hole of the intermediate bracket and the transfer insertion hole of the transfer body, the boss portion being engageable with the fastening bolt. The bracket insertion hole of the intermediate bracket, the transfer insertion hole of the transfer body, the boss portion of the transmission, and the fastening bolt may constitute at least one common fastener.

The intermediate bracket may be a bracket having an elasticity, and including a mount bush connected to the front portion of the rear mount bracket. Alternatively, the intermediate bracket may be a bracket excluding a mount bush. In this case, the front portion of the rear mount bush may include a mount bush having an elasticity.

The vehicle body may include a frame member such as a frame constituting the vehicle body, or a reinforcement member such as a cross member for reinforcing a frame member.

According to the present invention, it is possible to prevent loosening of a fastening bolt, and to stably support the rear mount bracket.

Specifically, in the power train supporting structure for a vehicle, it is possible to connect the transfer and the rear mount bracket appropriately for each type of vehicle without forming the transfer case separately by connecting the transfer (specifically, the transfer body) and the rear mount bracket via the intermediate bracket.

Further, in the power train supporting structure for a vehicle, it is possible to transmit a load exerted on the intermediate bracket to the transmission via the fastening bolt when the power train swings on a bumpy road surface or the like by commonly fastening the transmission, the transfer body, and the intermediate bracket by at least one common fastener.

According to the aforementioned configuration, in the power train supporting structure for a vehicle, for instance, it is possible to suppress a small sliding movement on contact surfaces between the transfer body and the intermediate bracket, and to prevent loosening of the fastening bolt. Further, in the power train supporting structure for a vehicle, it is possible to reduce a load exerted on the transfer. This makes it possible to prevent damage or breakage of the transfer, specifically, the transfer body.

Therefore, in the power train supporting structure for a vehicle, it is possible to prevent loosening of the fastening bolt and to stably support the rear mount bracket by providing at least one common fastener which commonly fastens the transmission, the transfer body, and the intermediate bracket.

According to an aspect of the present invention, the common fastener may be disposed between the fasteners which are adjacent to each other when viewed from a side of the vehicle among a plurality of fasteners for fastening the transmission and the transfer (specifically, the transfer body) with each other.

The fasteners adjacent to each other may be fasteners adjacent to each other in the vehicle front-rear direction or in the vehicle up-down direction when viewed from a side of the vehicle, or may be fasteners adjacent to each other in a clockwise direction.

According to the present invention, the power train supporting structure for a vehicle is advantageous in preventing loosening of the fastening bolt, and in securing a stable support state of the rear mount bracket.

Specifically, an area between adjacent fasteners when viewed from a side of the vehicle, out of the fasteners for fastening the transmission and the transfer with each other, has a relatively high rigidity. Therefore, the area is less likely to be flexed or deformed when a load is exerted.

In view of the above, in the power train supporting structure for a vehicle, it is possible to increase the rigidity in the vicinity of the boss portion of the transmission to be engaged with the fastening bolt by disposing the common fastener between the adjacent fasteners. Therefore, in the power train supporting structure for a vehicle, it is possible to increase the supporting rigidity of the intermediate bracket in a fastening state.

Thus, the power train supporting structure for a vehicle is advantageous in preventing loosening of the fastening bolt.

Therefore, in the power train supporting structure for a vehicle, it is possible to securely prevent loosening of the fastening bolt by disposing the common fastener between the adjacent fasteners. This is advantageous in securing a stable support state of the rear mount bracket.

Further, according to an aspect of the present invention, the common fastener may be disposed in the vicinity of an output shaft of the transfer to be connected with the propeller shaft when viewed from a side of the vehicle.

According to the present invention, in the power train supporting structure for a vehicle, it is possible to prevent loosening of the fastening bolt, and to reduce gear noise, which may be transmitted to the vehicle body via the rear mount bracket.

Specifically, the transfer outputs an output of the transmission to the propeller shaft connected to a drive pinion via a ring gear and a drive pinion gear disposed inside the transfer, for instance.

In this case, gear noise generated by meshing of teeth between a pair of gears may be transmitted to the vehicle body inside the transfer via a transfer case for pivotally supporting the drive pinion, and the rear mount bracket. As a result, a passenger may feel annoyed with gear noise transmitted to the vehicle compartment.

In view of the above, in the power train supporting structure for a vehicle, it is possible to transmit gear noise in a dispersed manner to a transmission path along which gear noise is transmitted to the vehicle body via the transfer case (specifically, the transfer body) and the rear mount bracket, and to a transmission path along which gear noise is transmitted to the transmission via the transfer case and the fastening bolt by providing the common fastener.

In this case, the common fastener is disposed in the vicinity of the output shaft of the transfer. Therefore, in the power train supporting structure for a vehicle, it is easy to transmit gear noise to the transmission side, as compared with a configuration, in which a common fastener is disposed at a position away from an output shaft of a transfer.

According to the aforementioned configuration, in the power train supporting structure for a vehicle, it is possible to reduce gear noise, which may be transmitted from the vehicle body to the vehicle compartment via the rear mount bracket. This is advantageous in reducing discomfort to a passenger.

Therefore, in the power train supporting structure for a vehicle, it is possible to prevent loosening of the fastening bolt, and to reduce gear noise, which may be transmitted to the vehicle body via the rear mount bracket, by disposing the common fastener in the vicinity of the output shaft of the transfer.

Further, according to an aspect of the present invention, the power train supporting structure may include a plurality of common fasteners which commonly fasten the transmission, the transfer body, and the intermediate bracket. At least one fastener which fastens the transmission and the transfer with each other may be disposed between the common fasteners adjacent to each other when viewed from a side of the vehicle.

The common fasteners adjacent to each other may be commonly fasteners adjacent to each other in the vehicle front-rear direction or in the vehicle up-down direction when viewed from a side of the vehicle, or may be common fasteners adjacent to each other in a clockwise direction.

According to the present invention, the power train supporting structure for a vehicle is advantageous in securely preventing loosening of the fastening bolt, and in securing a stable fastening state between the transmission and the transfer, specifically, the transfer body.

Specifically, in the power train supporting structure for a vehicle, it is possible to transmit a load exerted on the intermediate bracket in a dispersed manner to the transmission via the plurality of fastening bolts by providing the plurality of common fasteners.

According to the aforementioned configuration, the power train supporting structure for a vehicle is advantageous in securely preventing loosening of the fastening bolt, and in securely preventing damage or breakage of the transfer.

Further, in the power train supporting structure for a vehicle, it is possible to reduce a load to be transmitted to the transmission via the transfer body and the fastener by transmitting a load exerted on the intermediate bracket in a dispersed manner to the transmission via the plurality of fastening bolts. Therefore, the power train supporting structure for a vehicle is advantageous in preventing loosening of a bolt at a fastener located between adjacent common fasteners.

As described above, the power train supporting structure for a vehicle is advantageous in preventing loosening of the fastening bolt, and in securing a stable fastening state between the transmission and the transfer by disposing a fastener for fastening the transmission and the transfer with each other between adjacent common fasteners.

REFERENCE SIGNS LIST 1, 501 . . . Vehicle
2 . . . Drive shaft
3 . . . Front wheel
4 . . . Propeller shaft
6 . . . Rear wheel
7, 507 . . . Power train
8 . . . Steering gear box
10 . . . Transversely disposed engine
20, 520 . . . Transmission
30, 530 . . . Transfer
43, 543 . . . Suspension cross member
45a, 545a . . . Connection bolt
50 . . . Right mount bracket
60 . . . Left mount bracket
70, 570 . . . Rear mount bracket
71, 571 . . . Bracket front portion
72, 572 . . . Bracket rear portion
75 . . . Rear mount bush
75a . . . Bolt insertion hole
80, 580 . . . Intermediate bracket
81, 581 . . . Front mount bush
441a . . . Groove portion

The invention claimed is:

1. A power train supporting structure for a vehicle, comprising:
a power train including
a transversely disposed engine whose rotational axis is aligned with a vehicle width direction,
a transmission which transmits an output of the transversely disposed engine to front wheels via a drive shaft, and
a transfer which transmits an output of the transmission to rear wheels via a propeller shaft; and
a rear mount bracket which connects a rear portion of the power train with a vehicle body, and which swingably and resiliently supports the power train, wherein
a front portion of the rear mount bracket is connected to the transfer at a position which is below the drive shaft and is in a vehicle up-down directional area that is an overlapping of the transmission and the transfer in view of the vehicle width direction,
the transfer includes a transfer body, and an intermediate bracket which connects the front portion of the rear mount bracket with the transfer body, and
at least one common fastener fastens the transmission, the transfer body and the intermediate bracket to each other.

2. The power train supporting structure for a vehicle according to claim wherein
the rear mount bracket includes a rear mount bush at a rear portion thereof, the rear mount bush having an elasticity and including a bolt insertion hole for passing a connection bolt engageable with the vehicle body along the vehicle up-down direction.

3. The power train supporting structure for a according to claim 1, further comprising:
a cross member extending in the vehicle width direction on a vehicle rear side than the drive shaft, and on a vehicle lower side than the propeller shaft; and
a steering gear box to be connected with the front wheels in such a manner that the front wheels are steerable, and fixed to the cross member, wherein
the cross member includes a groove portion which extends in the vehicle width direction and is recessed toward the vehicle lower side, and
the steering gear box is disposed in the groove portion of the cross member.

4. The power train supporting structure for a vehicle according to claim 1, wherein
the transfer includes a transfer body; and an intermediate bracket lying between the transfer body and the front portion of the rear mount bracket, and mounted on the transfer body, and
the intermediate bracket includes a front mount bush having an elasticity and connected to the front portion of the rear mount bracket.

5. The power train supporting structure for a vehicle according to claim 1, wherein the transfer includes a transfer body, and a front mount bush having an elasticity and formed integrally with the transfer body, and the front portion of the rear mount bracket and the transfer body are connected to each other via the front mount bush.

6. The power train supporting structure for a vehicle according to claim 1, further comprising:

an engine-side mount bracket which swingably and resiliently supports the transversely disposed engine on the vehicle body; and a transmission-side mount bracket which swingably and resiliently supports the transmission on the vehicle body, wherein the rear mount bracket is disposed at a substantially middle of the vehicle body in the vehicle width direction, and the engine-side mount bracket and the transmission-side mount bracket suspend the power train in a front of and above the front portion of the rear mount bracket in the vehicle.

7. The power train supporting structure according to claim wherein the transfer and the transmission are fastened with each other at a plurality of positions, the intermediate bracket includes at least one bracket insertion hole allowing a fastening bolt for the connection of the transfer body to pass therethrough, the transfer body includes at least one transfer insertion hole for allowing the fastening bolt to pass therethrough, the transmission includes a boss portion which meets the bracket insertion hole of the intermediate bracket and the transfer insertion hole of the transfer body to engage with the fastening bolt, and the bracket insertion holy: of the intermediate bracket, the transfer insertion hole of the transfer body, the boss portion of the transmission, and the fastening bolt constitute the at least one common fastener.

8. The power train supporting structure for a vehicle according to claim 7, wherein the common fastener is disposed between specified ones of the plurality of fastening positions where the transmission and the transfer are fastened with each other, the specified ones being adjacent to each other in view from a side of the vehicle.

9. The power train supporting structure for a vehicle according to claim 7, wherein the common fastener is disposed at a position that is near an output shaft of the transfer in view from a side of the vehicle, the output shaft being to be connected with the propeller shaft.

10. The power train supporting structure for a vehicle according to claim 7, further comprising a plurality of common fasteners for fastening the transmission, the transfer body, and the intermediate bracket, integrally wherein at least one fastening position where the transmission and the transfer are fastened with each other lies between common fasteners adjacent to each other in view from a side of the vehicle.

11. The power train supporting structure for a vehicle according to claim 2, further comprising:

a cross member extending in the vehicle width direction on a vehicle rear side than the drive shaft, and on a vehicle lower side than the propeller shaft; and a steering gear box to be connected with the front wheels in such a manner that the front wheels are steerable, and fixed to the cross member, wherein the cross member includes a groove portion which extends in the vehicle width direction and is recessed toward the vehicle lower side, and the steering gear box is disposed in the groove portion of the cross member.

12. The power train supporting structure for a vehicle according to claim 2, wherein the transfer includes a transfer body; and an intermediate bracket lying between the transfer body and the front portion of the rear mount bracket, and mounted on the transfer body, and the intermediate bracket includes a front mount bush having an elasticity and connected to the front portion of the rear mount bracket.

13. The power train supporting structure for a vehicle according to claim 2, wherein the transfer includes a transfer body, and a front mount bush having an elasticity and formed integrally with the transfer body, and the front portion of the rear mount bracket and the transfer body are connected to each other via the front mount bush.

14. The power train supporting structure for a vehicle according to claim 2, further comprising:

an engine-side mount bracket which swingably and resiliently supports the transversely disposed engine on the vehicle body; and a transmission-side mount bracket which swingably and resiliently supports the transmission on the vehicle body, wherein the rear mount bracket is disposed at a substantially middle of the vehicle body in the vehicle width direction, and the engine-side mount bracket and the transmission-side mount bracket suspend the power train in a front of and above the front portion of the rear mount bracket in the vehicle.

15. The power train supporting structure for a vehicle according to claim 3, wherein the transfer includes a transfer body, and an intermediate bracket lying between the transfer body and the front portion of the rear mount bracket, and mounted on the transfer body, and the intermediate bracket includes a front mount bush having an elasticity and connected to the front portion of the rear mount bracket.

16. The power train supporting structure for a vehicle according to claim 3, wherein the transfer includes a transfer body, and a front mount bush having an elasticity and formed integrally with the transfer body, and the front portion of the rear mount bracket and the transfer body are connected to each other via the front mount bush.

17. The power train supporting structure for a vehicle according to claim 3, further comprising:

an engine-side mount bracket which swingably and resiliently supports the transversely disposed engine on the vehicle body; and a transmission-side mount bracket which swingably and resiliently supports the transmission on the vehicle body, wherein the rear mount bracket is disposed at a substantially middle of the vehicle body in the vehicle width direction, and the engine-side mount bracket and the transmission-side mount bracket suspend the power train in a front of and above the front portion of the rear mount bracket in the vehicle.

18. The power train supporting structure for a vehicle according to claim 8, wherein the common fastener is disposed at a position that is near an output shaft of the transfer in view from a side of the vehicle, the output shaft being to be connected with the propeller shaft.

19. The power train supporting structure for a vehicle according to claim 8, further comprising a plurality of common fasteners for fastening the transmission, the transfer body, and the intermediate bracket, integrally wherein at least one fastening position where the transmission and the transfer are fastened with each other lies between common fasteners adjacent to each other in view from a side of the vehicle.

20. A power train supporting structure for a vehicle, comprising:

a power train including a transversely disposed engine whose rotational axis is aligned with a vehicle width direction;

a transmission which transmits an output of the transversely disposed engine to front wheels via a drive shaft; and a transfer having a large diameter portion and a small diameter portion whose diameter is less than that of the large diameter portion; the small diameter portion being in front of the large diameter portion in a vehicle front-rear direction, and the transfer being configured to transmit an output of the transmission to rear wheels via a propeller shaft;

a cross member extending in the vehicle width direction on a vehicle rear side of the drive shaft in the vehicle front-rear direction, the cross member having a groove portion which extends in the vehicle width direction and is recessed toward a vehicle lower side below the small diameter portion of the transfer in a vehicle up-down direction and in front of the large diameter portion of the transfer in the vehicle front-rear direction; and a steering gear box to be connected with the front wheels in such a manner that the front wheels are steerable, the steering gear box being below the small diameter portion of the transfer in the vehicle up-down direction and in front of the large diameter portion of the transfer in the vehicle front-rear direction, and being disposed in the groove portion.

* * * * *